(12) United States Patent
Kim et al.

(10) Patent No.: US 12,524,098 B2
(45) Date of Patent: Jan. 13, 2026

(54) FOLDABLE ELECTRONIC DEVICE WHICH ACQUIRES THREE-DIMENSIONAL COORDINATE INFORMATION AND CONTROL METHOD THEREOF

(71) Applicant: SAMSUNG ELECTRONICS CO., LTD., Suwon-si (KR)

(72) Inventors: Mansung Kim, Suwon-si (KR); Minuk Kim, Suwon-si (KR); Bongjun Ko, Suwon-si (KR); Jaeho Lee, Suwon-si (KR); Yoondo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 18/540,367

(22) Filed: Dec. 14, 2023

(65) Prior Publication Data

US 2024/0118763 A1 Apr. 11, 2024

Related U.S. Application Data

(63) Continuation of application No. PCT/KR2022/005507, filed on Apr. 18, 2022.

(30) Foreign Application Priority Data

Jun. 14, 2021 (KR) .................. 10-2021-0076731

(51) Int. Cl.
*G06F 3/041* (2006.01)
*G06F 1/16* (2006.01)

(52) U.S. Cl.
CPC .......... *G06F 3/0416* (2013.01); *G06F 1/1643* (2013.01); *G06F 1/1652* (2013.01); *G06F 1/1681* (2013.01); *G06F 2203/04101* (2013.01)

(58) Field of Classification Search
CPC .... G06F 3/0416; G06F 1/1643; G06F 1/1652; G06F 1/1681; G06F 2203/04101;
(Continued)

(56) References Cited

U.S. PATENT DOCUMENTS 10,152,087 B2 * 12/2018 Jung ..................... G06F 1/1677
10,877,592 B2 * 12/2020 Yaginuma ............. G06F 3/1454
(Continued)

FOREIGN PATENT DOCUMENTS

CN 110069146 A 7/2019
KR 10-2011-0038980 A 4/2011
(Continued)

OTHER PUBLICATIONS

International Search Report (PCT/ISA/210) issued by the International Searching Authority on Jul. 26, 2022 in corresponding International Application No. PCT/KR2022/005507.
(Continued)

*Primary Examiner* — Lisa Lea-Edmonds
(74) *Attorney, Agent, or Firm* — Sughrue Mion, PLLC

(57) ABSTRACT

An electronic device includes: a hinge structure; a first housing connected to the hinge structure and including a first surface and a second surface; a second housing connected to the hinge structure and including a third surface and a fourth surface; a flexible display; a touch sensor; memory; and a processor, wherein the memory stores instructions configured to cause, when executed by the processor, the electronic device to, identify first coordinate information of at least one object on a first area of the flexible display and second coordinate information of the at least one object on a second area of the flexible display by using the touch sensor; and on the basis of the identified first coordinate information and the identified second coordinate information, identify three-
(Continued)

dimensional coordinate information of the at least one object in the space formed by the first surface and the third surface.

20 Claims, 25 Drawing Sheets

(58) Field of Classification Search
CPC ......... G06F 3/0425; G06F 2203/04102; G06F 2203/04808; G06F 1/1641; G06F 1/1677; G06F 1/1686; G06F 3/017; G06F 3/04883; G06F 3/041; G06F 3/042; G06F 3/044; G06F 3/04845; G06F 3/0488; G06F 3/005; G06F 3/0346
See application file for complete search history.

(56) References Cited

U.S. PATENT DOCUMENTS

| | | | | |
|---|---|---|---|---|
| 10,908,738 | B2* | 2/2021 | Kim | G06F 1/1677 |
| 11,073,866 | B2* | 7/2021 | Kim | G06F 1/1681 |
| 11,531,419 | B2* | 12/2022 | Park | G06F 3/044 |
| 11,544,957 | B2* | 1/2023 | Ryu | G06V 40/1318 |
| 11,545,117 | B2* | 1/2023 | Kim | G09G 5/14 |
| 11,556,246 | B2* | 1/2023 | Yoon | G06F 3/017 |
| 11,592,874 | B1* | 2/2023 | Seger, Jr. | G06F 3/04886 |
| 12,147,625 | B2* | 11/2024 | Astley | G06F 3/0416 |
| 12,181,937 | B2* | 12/2024 | Lee | G06F 1/1605 |
| 12,228,977 | B2* | 2/2025 | Chen | G09G 5/14 |
| 2010/0103133 | A1* | 4/2010 | Park | G06F 3/03545 345/173 |
| 2011/0084893 | A1* | 4/2011 | Lee | G06F 3/016 345/6 |
| 2014/0240248 | A1* | 8/2014 | Han | G06F 3/04166 345/173 |
| 2016/0259428 | A1* | 9/2016 | Hou | G06F 3/017 |
| 2017/0102738 | A1* | 4/2017 | Park | G06F 3/04883 |
| 2017/0123460 | A1* | 5/2017 | Jung | G06F 3/0445 |
| 2018/0059822 | A1* | 3/2018 | Seo | G06F 1/1652 |
| 2018/0226283 | A1 | 8/2018 | Amanullah | |
| 2019/0259351 | A1* | 8/2019 | Yoon | G09G 3/035 |
| 2020/0192547 | A1* | 6/2020 | Kim | G06F 1/1677 |
| 2020/0233461 | A1* | 7/2020 | Kim | G06F 1/1681 |
| 2021/0035494 | A1 | 2/2021 | Yildiz et al. | |
| 2021/0041912 | A1 | 2/2021 | Eom et al. | |
| 2021/0048926 | A1* | 2/2021 | Woo | G06F 3/0447 |
| 2021/0149542 | A1* | 5/2021 | Kim | G06F 1/1643 |
| 2022/0147176 | A1* | 5/2022 | Park | G06F 3/0416 |
| 2022/0269314 | A1* | 8/2022 | Chen | G06F 3/04886 |
| 2023/0023401 | A1* | 1/2023 | Heo | G01L 1/2293 |
| 2023/0243916 | A1* | 8/2023 | Lee | H01Q 21/28 |
| 2023/0280875 | A1* | 9/2023 | Kim | G06F 3/04886 715/788 |
| 2023/0393631 | A1* | 12/2023 | Chen | G06F 1/1641 |
| 2024/0118763 | A1* | 4/2024 | Kim | G06F 3/042 |
| 2025/0071410 | A1* | 2/2025 | Jang | H04M 1/0245 |

FOREIGN PATENT DOCUMENTS

| | | |
|---|---|---|
| KR | 10-2013-0098837 A | 9/2013 |
| KR | 10-2014-0105362 A1 | 9/2014 |
| KR | 10-1542129 B1 | 8/2015 |
| KR | 10-2017-0043076 A | 4/2017 |
| KR | 10-2017-0051648 A | 5/2017 |
| KR | 10-2018-0026024 A | 3/2018 |
| KR | 10-2019-0107140 A | 9/2019 |
| KR | 10-2118610 B1 | 6/2020 |
| KR | 10-2021-0017038 A | 2/2021 |

OTHER PUBLICATIONS

Written Opinion (PCT/ISA/237) issued by the International Searching Authority on Jul. 26, 2022 in corresponding International Application No. PCT/KR2022/005507.
Communication dated Aug. 27, 2024, issued by the European Patent Office in counterpart European Application No. 22825142.7.
Communication issued Sep. 5, 2025 by the Korean Intellectual Property Office in Korean Patent Application No. 10-2021-0076731.

* cited by examiner

FOLDABLE ELECTRONIC DEVICE WHICH ACQUIRES THREE-DIMENSIONAL COORDINATE INFORMATION AND CONTROL METHOD THEREOF

CROSS-REFERENCE TO RELATED APPLICATION(S)

This application is a by-pass continuation application of International Application No. PCT/KR2022/005507, filed on Apr. 18, 2022, which based on and claims priority to Korean Patent Application No. 10-2021-0076731, filed on Jun. 14, 2021, in the Korean Intellectual Property Office, the disclosures of which are incorporated by reference herein in their entireties.

BACKGROUND

Field

The disclosure relates to a foldable electronic device for obtaining three-dimensional coordinate information and a method for controlling the same.

Description of Related Art

Touch screen-equipped electronic devices are gaining popularity. An electronic device may display graphic object-containing screens on the touchscreen. A user may touch a point on the touchscreen using her finger or a stylus pen. The electronic device may detect the position of the touch on the touchscreen. The electronic device may perform a function associated with a graphic object corresponding to the detected position. Or, the electronic device may be wired and/or wirelessly connected to an external electronic device, detect the position of the touch on the touchscreen, and control the external electronic device in response to the detected position. For example, the electronic device may control the screen displayed on the display of the connected external electronic device based on the detected position.

On the other hand, in the past, portable electronic devices were mainly of the bar type whose form (e.g., appearance) is not deformable, while in recent years, portable electronic devices that are transformable, such as foldable and/or rollable ones, have been developed and released. Such transformable electronic devices may include, e.g., a display (e.g., flexible display) having at least a portion that is folded or unfolded and/or is rollable.

An electronic device including a touchscreen may detect the position of an object (e.g., the user's finger and/or a stylus pen) on the touchscreen. The electronic device may identify two-dimensional coordinates and/or three-dimensional coordinates of an object positioned on or near the touchscreen. For example, the electronic device may include a touch sensor panel (TSP) (in other words, a touch sensor) constituted of a plurality of electrodes. The electronic device may detect a change in the capacitance (e.g., self-capacitance and/or mutual-capacitance) of at least some of the plurality of electrodes if an object is positioned in contact or adjacent to the touchscreen and identify the two-dimensional coordinates of the object on the touchscreen. In addition to the identified two-dimensional coordinates, the electronic device may identify the height (e.g., vertical distance) of the position of the object from the touchscreen based on the degree of change in capacitance to identify the three-dimensional coordinates of the object on the touchscreen.

However, in the method for identifying the height of the object by detecting the degree of change in capacitance, as the object is positioned a predetermined distance or more away from the touchscreen, the accuracy of detection of the degree of change in capacitance is reduced, causing it difficult for the electronic device to precisely identify the three-dimensional coordinates of the object.

Meanwhile, the foldable electronic device, in a state of being folded within a predetermined angular range, may form at least two areas of the touchscreen which are not parallel to each other. For example, the flexible display may be deformed to form a predetermined angle based on the folding of at least a portion of the flexible display. If an object is positioned between the at least two areas forming the predetermined angle, the electronic device may object three-dimensional coordinates of the object by identifying the two-dimensional coordinates of the object through each area and/or obtain more precise three-dimensional coordinates by identifying the three-dimensional coordinates of the object through each area.

SUMMARY

Provided are an electronic device and a control method thereof, which obtain three-dimensional coordinate information about at least one object by identifying coordinate information about at least one object through each of at least two touchscreen areas.

Further, provided are an electronic device and a control method thereof, which are capable of three-dimensional manipulation for the electronic device and/or an external electronic device by obtaining three-dimensional coordinate information about each of a plurality of objects through each of at least two touchscreen areas not parallel to each other.

According to an aspect of the disclosure, an electronic device includes: a first housing including a first surface facing in a first direction and a second surface facing in a second direction opposite to the first direction; a second housing including a third surface facing in a third direction and a fourth surface facing in a fourth direction opposite to the third direction; a hinge structure foldably connecting the first housing and the second housing, wherein in a folded state of the electronic device, the first surface faces the third surface and, in an unfolded state, the first surface and the third surface form a substantially coplanar plane; a flexible display including a first area exposed through at least a portion of the first surface of the first housing and a second area exposed through at least a portion of the third surface of the second housing; a touch sensor provided at a position corresponding to at least a partial area of the flexible display; memory, and a processor, wherein the memory may store instructions configured to cause, when executed by the processor, the electronic device to, identify, using the touch sensor, first coordinate information of at least one object on the first area and second coordinate information of the at least one object on the second area; and identify, based on the first coordinate information and the second coordinate information, three-dimensional coordinate information of the at least one object on a space formed by the first surface and the third surface.

The memory may store instructions configured to cause, when executed by the processor, the electronic device to, change a coordinate value measured with respect to the first surface into a coordinate value on a predesignated coordinate system based on a predesignated angle; and identify the three-dimensional coordinate information based on the changed coordinate value and the second coordinate information.

The electronic device may further include at least one angle sensor configured to sense an angle between the first surface and the third surface, the memory may store instructions configured to cause, when executed by the processor, the electronic device to, identify, using the at least one angle sensor, the angle between the first surface and the third surface; change a coordinate value of the first coordinate information into a coordinate value on a predesignated coordinate system based on the identified angle; and identify the three-dimensional coordinate information based on the changed coordinate value and the second coordinate information.

The memory may store instructions configured to cause, when executed by the processor, the electronic device to, identify a difference between the angle between the first surface and the third surface and a predesignated angle; and change at least one of the first coordinate information or the second coordinate information based on the identified difference.

The memory may store instructions configured to cause, when executed by the processor, the electronic device to, apply a weight to at least one of the first coordinate information or the second coordinate information; and identify the three-dimensional coordinate information based on applying the weight to the at least one of the first coordinate information or the second coordinate information.

The first coordinate information may include a first coordinate on a first axis and a second coordinate on a second axis, the second coordinate information may include a third coordinate on the first axis and a fourth coordinate on a third axis, the third coordinate is related to the first coordinate, and the at least one processor may be further configured to identify the three-dimensional coordinate information based on at least one of the second coordinate, the fourth coordinate, and the first coordinate or the third coordinate.

The first coordinate information may include a first coordinate on a first axis, a second coordinate on a second axis, and a third coordinate on a third axis, the second coordinate information may include a fourth coordinate on the first axis, a fifth coordinate on the second axis, and a sixth coordinate on the third axis, and the fourth coordinate is related to the first coordinate.

The electronic device may further include at least one of a camera or a time-of-flight (ToF) sensor, the at least one processor may be further configured to: obtain position information about the at least one object from the at least one of the camera or the ToF sensor; and modify at least one of the first coordinate information, the second coordinate information, or the three-dimensional coordinate information based on the position information.

The at least one of the camera or the ToF sensor may be exposed to an outside through at least one of the first surface or the third surface or is provided under at least one of the first area or the second area.

The memory may store instructions configured to cause, when executed by the processor, the electronic device to, identify, using the at least one of the camera or the ToF sensor, a position of the at least one object for an area related to the identified three-dimensional coordinate information.

The memory may store instructions configured to cause, when executed by the processor, the electronic device to, based on an angle between the first surface and the third surface being greater than or equal to a predesignated angle, identify two-dimensional coordinate information of the at least one object on the first area or the second area based on the first coordinate information or the second coordinate information, and based on the angle between the first surface and the third surface being less than or equal to the predesignated angle, identify the three-dimensional coordinate information.

The electronic device may further include at least one posture sensor, the at least one posture sensor may include at least one of an acceleration sensor, a gyro sensor, or a gravity sensor, and the at least one processor may be further configured to: identify a posture of the electronic device using the at least one posture sensor; and determine the identified three-dimensional coordinate information based on the identified posture.

The memory may store instructions configured to cause, when executed by the processor, the electronic device to, display a position of the at least one object in at least one of the first area or the second area based on at least one of the first coordinate information, the second coordinate information, or the identified three-dimensional coordinate information.

The memory may store instructions configured to cause, when executed by the processor, the electronic device to, display a different position of the at least one object according to a distance from at least one of the first area or the second area to the at least one object.

The memory may store instructions configured to cause, when executed by the processor, the electronic device to, identify at least one of a position or a movement of each of the at least one object based on the identified three-dimensional coordinate information: identify a user gesture based on at least one of the identified at least one of the position or the movement of the at least one object; and control an external electronic device to perform a designated operation corresponding to the identified gesture.

According to one or more embodiments, the electronic device may more precisely obtain three-dimensional coordinate information about at least one object by identifying coordinate information about at least one object through each of at least two touchscreen areas.

According to one or more embodiments, the electronic device may provide various user experiences by three-dimensionally manipulating the electronic device and/or an external electronic device using three-dimensional coordinate information about each of a plurality of objects.

Various effects achievable according to the disclosure are not limited by the foregoing effects.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION

Figure 1:
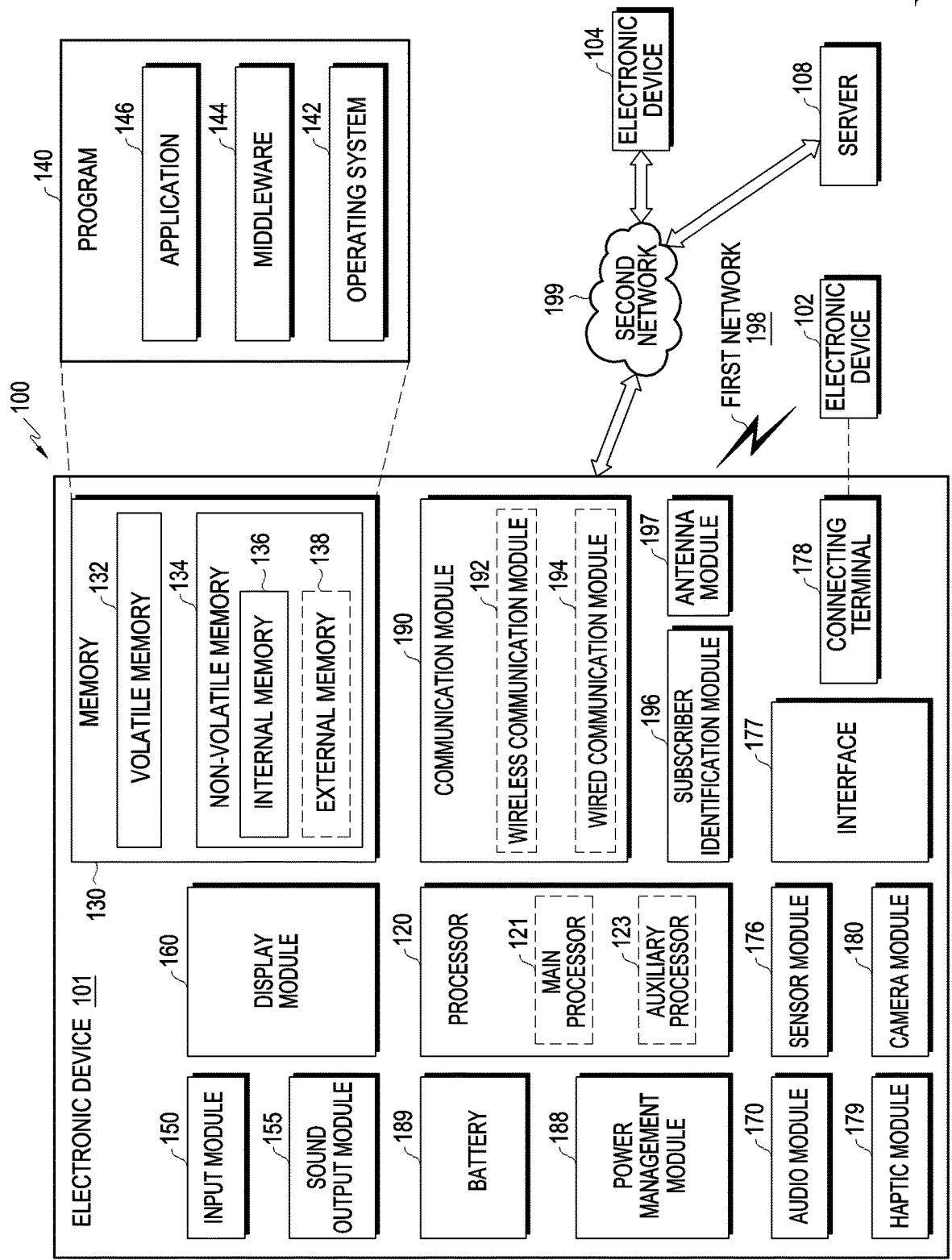
FIG. 1 is a view illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
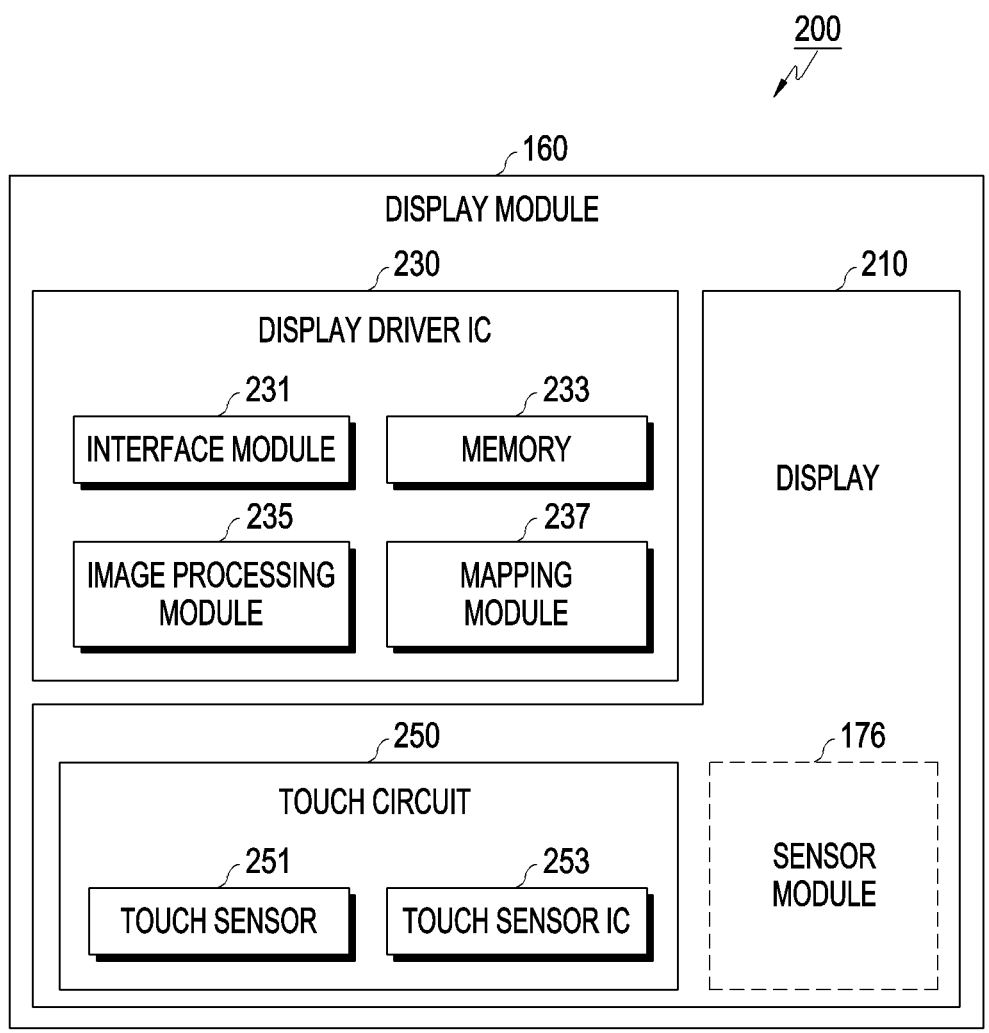
FIG. 2 is a block diagram illustrating a display module according to an embodiment.

FIG. 2 is a block diagram 200 illustrating a display module 160 according to various embodiments. Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
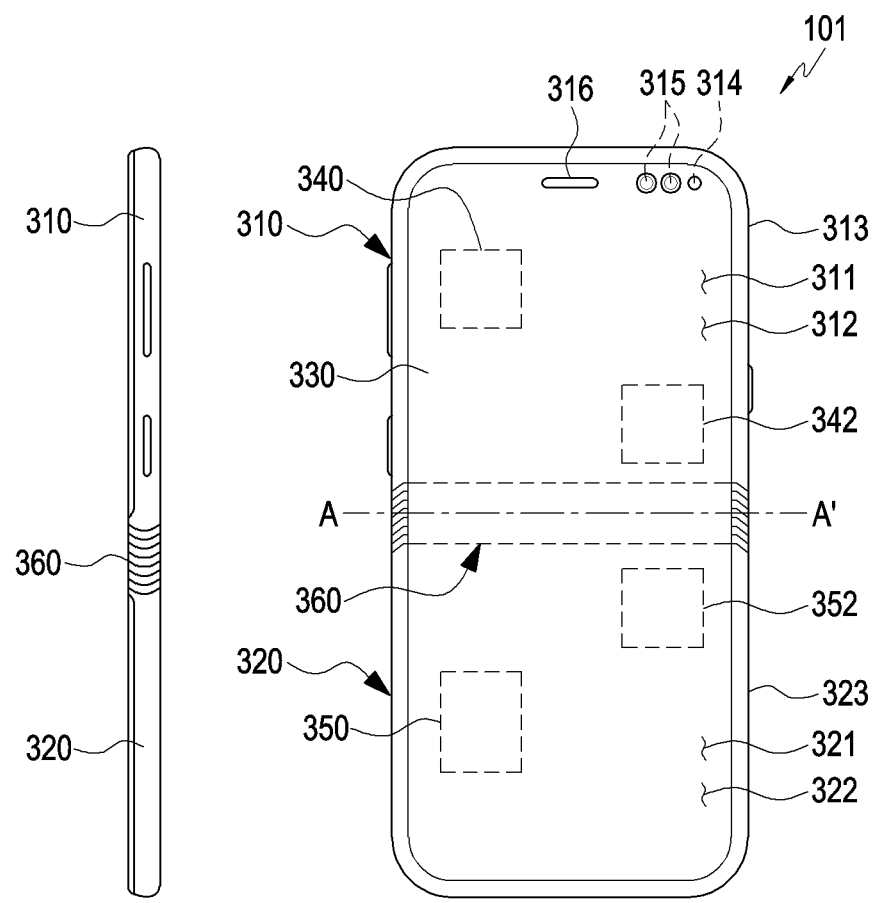
FIG. 3A is a view illustrating an unfolded state of an electronic device with respect to a folding direction according to an embodiment.

FIG. 3A is a view illustrating an unfolded state of an electronic device 101 with respect to a folding direction according to an embodiment.

Referring to FIG. 3A, an electronic device 101 may include a pair of housing structures (e.g., a first housing 310 and a second housing 320) rotatably coupled with respect to a folding axis (e.g., A-A' of FIG. 3A) through a hinge structure to be folded with respect to each other and a display 330 (e.g., the display module 160 of FIG. 1) disposed in a space formed by the pair of housing structures (e.g., first housing 310 and second housing 320). According to one or more embodiments, the display 330 may be implemented as a flexible display having at least a foldable portion (e.g., folding area 360).

According to an embodiment, the first housing 310 and the second housing 320 may be disposed on two opposite sides of the folding axis (e.g., a horizontal folding axis A-A').

According to an embodiment, the first housing 310 may include a first surface 311 facing in a first direction (e.g., the front side of the first housing 310) of the electronic device 101, a second surface 312 facing in a second direction (e.g., the rear side of the first housing 310) which is opposite to the first direction, and a first side member 313 surrounding at least a portion of a space between the first surface 311 and the second surface 312.

According to an embodiment, the second housing 320 may include a third surface 321 facing in a third direction (e.g., the front side of the second housing 320) of the electronic device 101, a fourth surface 322 facing in a fourth direction (e.g., the rear side of the second housing 320) which is opposite to the third direction, and a second side member 323 surrounding at least a portion of a space between the third surface 321 and the fourth surface 322.

According to an embodiment, the display 330 (e.g., a flexible display) may be exposed through at least a portion of the first surface 311 and the third surface 321. In describing various embodiments of the disclosure, of the entire area of the display 330 (e.g., a flexible display), at least a portion of the area exposed through the first surface 311 and at least a portion of the area exposed through the third surface 321 are described as a first area and a second area, respectively. According to an embodiment, of the entire area of the display 330 (e.g., a flexible display), at least a portion of the area exposed through the first surface 311 and at least a portion of the area exposed through the third surface 321 may be described as a second area and a first area, respectively. According to an embodiment, unlike the second housing 320, the first housing 310 includes an area in which a camera 314 (e.g., the camera module 180 of FIG. 1) and sensors 315 (e.g., the sensor module 176 of FIG. 1) are disposed, but it may have mutually symmetrical shapes in the other areas. In another embodiment, the area in which the camera 314 and sensors 315 are disposed may be additionally disposed in, or replaced with, at least a partial area of the second housing 320. In another embodiment, at least part of the camera 314 or sensors 315 may be disposed in at least a partial area of the first housing 310, and the remaining part may be disposed in at least a partial area of the second housing 320.

According to an embodiment, the camera 314 may be exposed on the front surface of the electronic device 101 through an opening provided in one corner of the first housing 310. Although not illustrated, at least one camera may be disposed under at least a partial area of the display 330 (e.g., under the first area and/or the second area).

According to an embodiment, the sensors 315 may include at least one of a proximity sensor, an illuminance sensor, an iris recognition sensor, an ultrasonic sensor, a time-of-flight (ToF) sensor, or an indicator. For example, the sensors 315 may be exposed to the front side of the electronic device 101 through an opening provided in one corner of the first housing 310, or may be disposed under at least a partial area of the display 330 (e.g., under the first area and/or the second area).

According to an embodiment, the receiver 316 may be disposed through at least a partial area of the first housing 310. Although not illustrated, the electronic device 101 may further include an ear jack hole, an external speaker module, a SIM card tray, an interface connector port, or at least one key button disposed through the first housing 310 and/or the second housing 320.

According to an embodiment, the angle and/or distance between the first housing 310 and the second housing 320 may vary depending on the unfolded state (e.g., the state of FIG. 3A), the folded state (e.g., the state of FIG. 3B to be described below), or the intermediate state of the electronic device 101.

According to an embodiment, in the unfolded state (e.g., the state of FIG. 3A) of the electronic device 101, the first surface 311 of the first housing 310 and the third surface 321 of the second housing 320 may be disposed to be parallel to each other. For example, in the unfolded state of the electronic device 101, the first surface 311 (or the first area) and the third surface 321 (or the second area) may face in the same direction (e.g., the first direction and the third direction are parallel to each other), and may form substantially the same plane (e.g., the angle formed by the first surface 311 and the third surface 321 may be substantially 180 degrees). According to an embodiment, in the unfolded state of the electronic device 101, the folding area 360 may form substantially the same plane as the first surface 311 (or the first area) and the third surface 321 (or the second area).

According to an embodiment, in the folded state of the electronic device 101 (e.g., the state of FIG. 3B to be described below), the first surface 311 of the first housing 310 and the third surface 321 of the second housing 320 may be disposed to face each other. For example, in the folded state of the electronic device 101, the first surface 311 (or the first area) and the third surface 321 (or the second area) may face in opposite directions (e.g., the first direction and the third direction are opposite to each other), and may form a narrow angle (e.g., between 0 degrees and 10 degrees) and/or a short distance therebetween. According to an embodiment, in the folded state of the electronic device 101, at least a portion of the folding area 360 may be formed as a curved surface having a predetermined curvature.

According to an embodiment, in the intermediate state of the electronic device 101, the first surface 311 of the first housing 310 and the third surface 321 of the second housing 320 may be disposed at a predetermined angle therebetween. For example, in the intermediate state of the electronic device 101, the first surface 311 (or the first area) and the third surface 321 (or the second area) may form an angle greater than that in the folded state and smaller than that in the unfolded state, and/or may form a distance longer than that in the folded state and shorter than that in the unfolded state. According to an embodiment, in the intermediate state of the electronic device 101, at least a portion of the folding area 360 may be formed of a curved surface having a predetermined curvature, in which case the curvature may be smaller than that in the folded state.

According to an embodiment, the unfolded state may be called an open state, the folded state may be called a closed state, and/or the intermediate state may be called a half folded state, and the above-described states may be called in other terms. According to an embodiment, the above-described states may be described as modes.

According to an embodiment, the electronic device 101 (e.g., the processor 120 of FIG. 1) may identify the state (e.g., the unfolded state, the intermediate state, and/or the folded state) of the electronic device 101, based on the angle and/or distance between the first housing 310 and the second housing 320. For example, the electronic device 101 may include an angle sensor that measures the angle between the first housing 310 and the second housing 320 or measures the angle at which the folding axis (e.g., A-A' in FIG. 3A) is rotated. The electronic device 101 may identify the angle between the first housing 310 and the second housing 320 and/or the angle at which the folding axis (e.g., Ain FIG. 3A) is rotated, based on data obtained from the angle sensor, and may identify that the electronic device 101 is in any one of the unfolded state, the intermediate state, or the folded state, based on the identified angle. According to an embodiment, the electronic device 101 may perform at least one operation based on the angle between the first housing 310 and the second housing 320 in the intermediate state, and is described in more detail with reference to the drawings to be described below.

According to an embodiment, the electronic device 101 may include a first motion sensor 340 and a magnetic body (e.g., a magnet) 342 disposed on at least a portion of the first housing 310. According to an embodiment, the first motion sensor 340 may be configured as a combination of at least two of an acceleration sensor, an angular velocity sensor (e.g., a gyro sensor), or a geomagnetic sensor. For example, the electronic device 101 may detect the posture and the movement of the first housing 310 through the first motion sensor 340. For example, the posture of the first housing 310 may be detected based on the acceleration sensor of the first motion sensor 340, and the motion of the first housing 310 may be detected based on the angular velocity sensor of the first motion sensor 340. According to an embodiment, the magnetic body 342 may be disposed in at least a portion of the first housing 310 adjacent to the folding area 360.

According to an embodiment, the electronic device 101 may include a second motion sensor 350 and a magnetic force sensor module 352 disposed on at least a portion of the second housing 320. According to an embodiment, the second motion sensor 350 may be configured as a combination of at least two of an acceleration sensor, an angular velocity sensor (e.g., a gyro sensor), or a geomagnetic sensor. For example, the electronic device 101 may detect the posture of the second housing 320 through the acceleration sensor of the second motion sensor 350 and may detect the movement of the second housing 320 through the angular velocity sensor of the second motion sensor 350. According to an embodiment, the magnetic force sensor module 352 may be disposed in at least a portion of the second housing 320 adjacent to the folding area 360. For example, the magnetic body 342 of the first housing 310 and the magnetic force sensor module 352 of the second housing 320 may be disposed to at least partially face each other in the folded state of the electronic device 101 as shown in FIG. 3B.

Figure 3B:
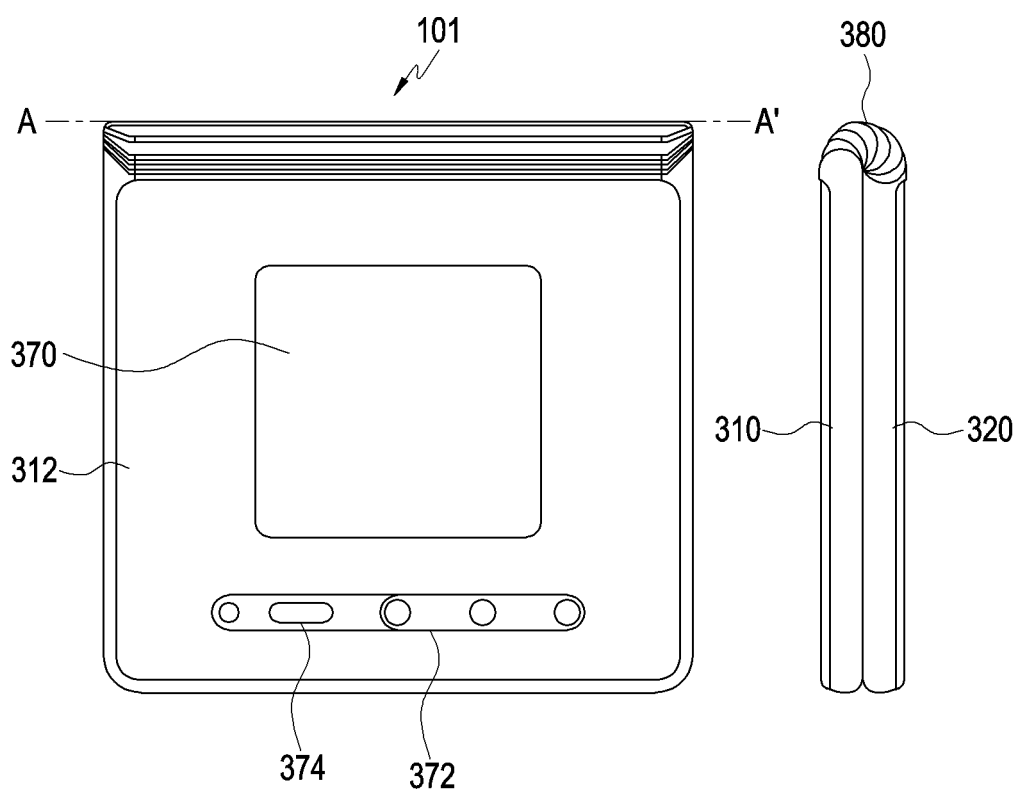
FIG. 3B is a view illustrating a folded state of an electronic device according to an embodiment.

FIG. 3B is a view illustrating a folded state of an electronic device 101 according to an embodiment.

According to an embodiment, the electronic device 101 may include a hinge cover 380 that covers a foldable portion of the housing of the electronic device 101, and at least a portion of the hinge cover 380 may be coupled to the first housing 310 and the second housing 320.

According to an embodiment, the electronic device 101 may include a rear camera device 372 and/or a proximity sensor 374. According to an embodiment, at least a portion of a sub display 370 may be visually exposed through the second surface 312 of the first housing 310.

According to an embodiment, one or more components may be disposed on the rear surface (e.g., the second surface 312 and/or the fourth surface 322) of the electronic device 101, or one or more components may be visually exposed. According to an embodiment, one or more components (e.g., a camera and/or a sensor) may be visually exposed through the rear surface (e.g., the second surface 312) of the first housing 310.

Figure 3C:
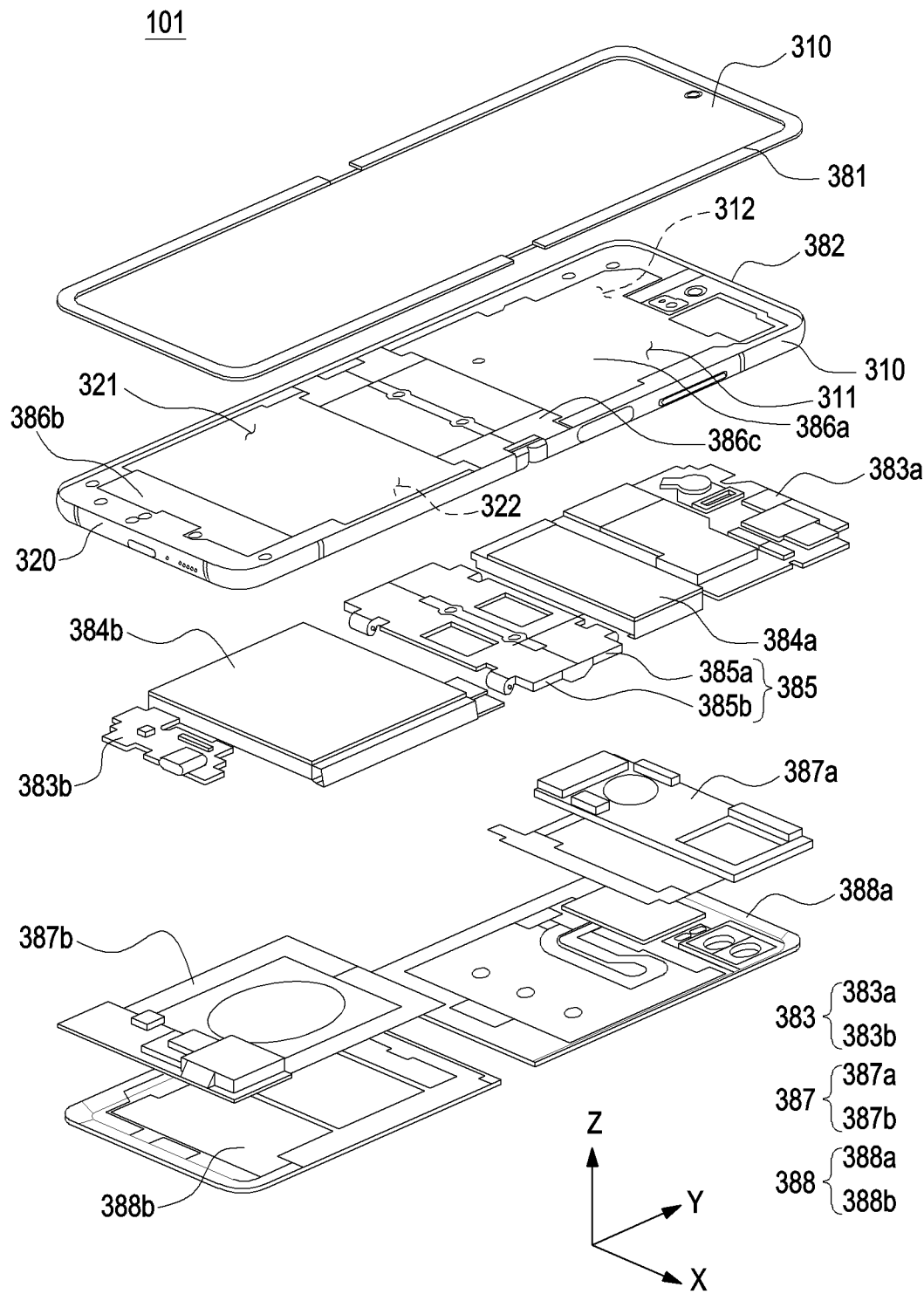
FIG. 3C is an exploded perspective view illustrating an electronic device according to an embodiment.

FIG. 3C is an exploded perspective view illustrating an electronic device 101 according to an embodiment.

Referring to FIG. 3C, according to an embodiment, an electronic device 101 may include a display 330, a foldable housing 382 (e.g., the first housing 310 and the second housing 320), a printed circuit board 383, a hinge structure 385, an antenna module 387, and a rear cover 388.

According to an embodiment, the display 330 may be exposed through a majority portion of the front plate 381. According to an embodiment, the shape of the display 330 may be formed to be substantially the same as the shape of the periphery of the front plate 381.

According to an embodiment, the foldable housing 382 may include a first housing 310 and a second housing 320. According to an embodiment, the first housing 310 may include a first surface 311 and a second surface 312 facing away from the first surface 311, and the second housing 320 may include a third surface 321 and a fourth surface 322 facing away from the third surface 321. The foldable housing 382 may additionally or alternatively include a bracket assembly. The bracket assembly may include a first bracket assembly 386a disposed in the first housing 310 and a second bracket assembly 386b disposed in the second housing 320. At least a portion of the bracket assembly, e.g., the portion 386c including at least a portion of the first bracket assembly 386a and at least a portion of the second bracket assembly 386b, may serve as a plate for supporting the hinge structure 385.

According to an embodiment, various electric components may be disposed on the printed circuit board 383. For example, a processor (e.g., the processor 120 of FIG. 1), a memory (e.g., the memory 130 of FIG. 1), and/or an interface (e.g., the interface 177 of FIG. 1) may be mounted on the printed circuit board 383. The processor may include one or more of, e.g., a central processing unit, an application processor, a graphic processing device, an image signal processing, a sensor hub processor, or a communication processor. The memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the printed circuit board 383 may include a first printed circuit board 383a disposed on the side of the first bracket assembly 386a and a second printed circuit board 383b disposed on the side of the second bracket assembly 386b. The first printed circuit board 383a and the second printed circuit board 383b may be disposed in a space formed by the foldable housing 382, the bracket assembly, the first rear cover 388a, and/or the second rear cover 388b. Components for implementing various functions of the electronic device 101 may be separately disposed on the first printed circuit board 383a and the second printed circuit board 383b. For example, a processor may be disposed on the first printed circuit board 383a, and an audio interface may be disposed on the second printed circuit board 383b.

According to an embodiment, a battery may be disposed adjacent to the printed circuit board 383 to supply power to the electronic device 101. At least a portion of the battery may be disposed on substantially the same plane as the printed circuit board 383. According to an embodiment, a first battery 384a (e.g., the battery 189 of FIG. 1) may be disposed adjacent to the first printed circuit board 383a, and a second battery 384b (e.g., the battery 189 of FIG. 1) may be disposed adjacent to the second printed circuit board 383b. The battery (e.g., the first battery 384a and/or the second battery 384b) may supply power to at least one component of the electronic device 101. According to an embodiment, the battery may include, e.g., a primary cell which is not rechargeable, a secondary cell which is rechargeable, or a fuel cell. The battery may be integrally or detachably disposed inside the electronic device 101.

According to an embodiment, the hinge structure 385 may be a component for supporting the foldable housing 382 and/or bracket assembly to allow the foldable housing 382 to rotate about the folding axis (e.g., A-A' of FIG. 3A). The hinge structure 385 may include a first hinge structure 385a disposed on a side of the first printed circuit board 383a and a second hinge structure 385b disposed on a side of the second printed circuit board 383b. The hinge structure 385 may be disposed between the first printed circuit board 383a and the second printed circuit board 383b. According to an embodiment, the hinge structure 385 may be substantially integrated with the portion 386c including at least a portion of the first bracket assembly 386a and at least a portion of the second bracket assembly 386b.

According to an embodiment, the antenna module 387 may include at least one antenna module 387a or 387b disposed between the rear cover 388 and the battery. The antenna module 387 may include, e.g., a near-field communication (NFC) antenna, a wireless charging antenna, and/or a magnetic secure transmission (MST) antenna. The antenna module 387 may perform short-range communication with, e.g., an external device or may wirelessly transmit or receive power necessary for charging. According to another embodiment, an antenna structure may be formed by a portion or combination of the side bezel structure of the foldable housing 382 and/or bracket assembly.

According to an embodiment, the rear cover 388 may include a first rear cover 388a and a second rear cover 388b. The rear cover 388 may be coupled to the foldable housing 382 to protect the above-described components (e.g., the printed circuit board 383, the battery, and the antenna module 387) disposed in the foldable housing 382. As described above, the rear cover 388 may be configured substantially integrally with the foldable housing 382.

Figure 4:
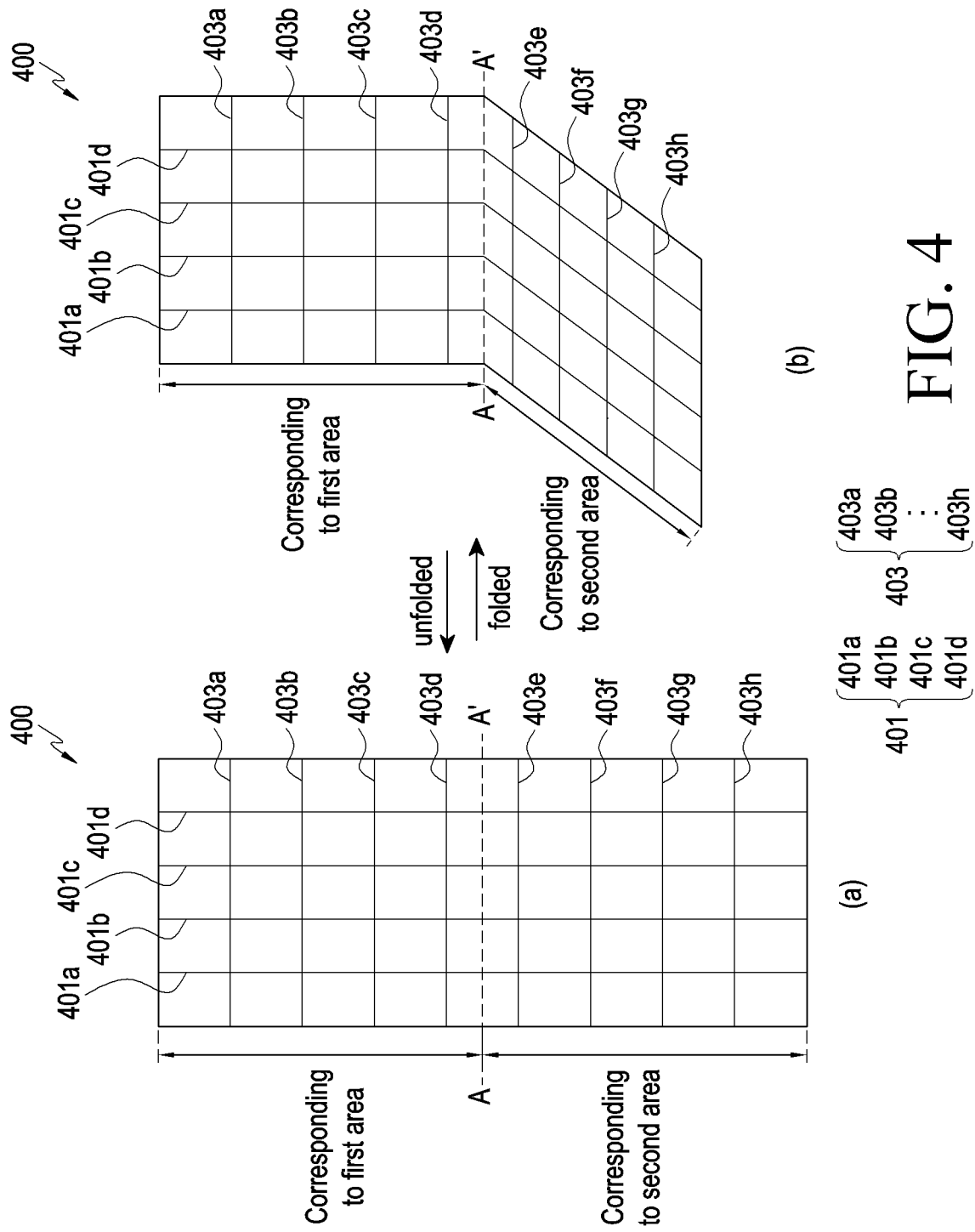
FIG. 4 illustrates a sensor layer according to an embodiment.

FIG. 4 illustrates a sensor layer 400 (e.g., the touch sensor 251 of FIG. 3A) according to an embodiment.

According to an embodiment, the sensor layer 400 may include one or more first electrodes 401a, 401b, 401c, and 401d and one or more second electrodes 403a, 403b, 403c, 403d, 403e, 403f, 403g, and 403h. According to an embodiment, the first electrodes 401 may extend in the vertical direction, and the second electrodes 403 may extend in the horizontal direction. In FIG. 4, the first electrodes 401 and the second electrodes 403 are illustrated as rod shapes, but may be implemented in the form of a mesh, and the shape of the electrode is not limited. Although FIG. 4 illustrates four first electrodes 401 and seven second electrodes 403, the number of electrodes included in the first electrodes 401 and the second electrodes 403 is not limited.

According to an embodiment, the sensor layer 400 may be implemented as a single layer or multiple layers. For example, when the sensor layer 400 is implemented as a single layer, the first electrodes 401 and the second electrodes 403 may be disposed on the substrate of the display (e.g., the display 210 of FIG. 2) of the electronic device (e.g., the electronic device 101 of FIG. 1). In a portion in which at least one of the first electrodes 401 and at least one of the second electrodes 403 overlap each other, an insulating material may be positioned between the electrodes, and each of the first electrodes 401 and the second electrodes 403 may be connected through bridges. As another example, when the sensor layer 400 is implemented as a plurality of layers, the first electrodes 401 may be disposed on a first substrate and the second electrodes 403 may be disposed on a second substrate, and the first substrate and the second substrate may be stacked.

According to an embodiment, the sensor layer 400 may be implemented separately from the display panel or may be implemented integrally with the display panel. For example, the sensor layer 400 may be implemented as an on-cell touch active matrix organic light-emitting diode (AMOLED) (OCTA), and the sensor layer 400 may directly be deposited on an AMOLED display. As another example, the sensor layer 400 may be implemented as YOUM-on cell touch AMOLED (Y-OCTA), and the sensor layer 400 may be directly deposited on the flexible AMOLED display. As another example, the sensor layer 400 may be deposited inside the display panel.

According to an embodiment, the electronic device 101 may detect the position (e.g., touch position and/or hovering position) of an object (e.g., a user's finger and/or a stylus pen) on the touch screen (e.g., the display 210 of FIG. 2), based on a change in self-capacitance and/or mutual capacitance for at least some of the first electrodes 401 and/or the second electrodes 403. Hereinafter, operations of the electronic device 101 may be described as operations of at least one processor (e.g., the processor 120 of FIG. 1 and/or the touch sensor IC 253 of FIG. 2).

According to an embodiment, the electronic device 101 may detect a change in self-capacitance for at least some of the first electrodes 401 and/or the second electrodes 403. For example, the electronic device 101 may control a driving circuit to simultaneously or sequentially apply a driving signal to each of the first electrodes 401 and the second electrodes 403 and, if an electrical signal is received by a touch sensing circuit from each of the first electrodes 401 and the second electrodes 403, detect a change in the self-capacitance of each of the first electrodes 401 and the second electrodes 403 based on the received electrical signal. For example, the driving circuit and switches may be disposed between the first electrodes 401 and the second electrodes 403, respectively. The electronic device 101 may control the switches to be sequentially turned on to sequentially apply a driving signal to each of the first electrodes 401 and the second electrodes 403, and may simultaneously or sequentially detect a change in the self-capacitance of each of the first electrodes 401 and the second electrodes 403. As another example, the electronic device 101 may control the switches to be simultaneously turned on using driving signals having orthogonality, may apply the driving signal having the orthogonality to each of the first electrodes 401 and the second electrodes 403, and may simultaneously or sequentially detect a change in the self-capacitance of each of the first electrodes 401 and the second electrodes 403. As an example, the electronic device 101 may detect a change in the self-capacitance of each of the first electrodes 401 by applying driving signals to the first electrodes 401 in the order of the electrode 401a, the electrode 401b, the electrode 401c, and the electrode 401d (hereinafter, sensing in the vertical direction), and detect a change in the self-capacitance of each of the second electrodes 403 by applying driving signals to the second electrodes 403 in the order of the electrode 403a, the electrode 403b, the electrode 403c, the electrode 403d, the electrode 403e, the electrode 403f, the electrode 403g, and the electrode 403h (hereinafter, sensing in the horizontal direction). In this case, the electronic device 101 may perform vertical sensing by applying a driving signal to the electrode 401a and perform horizontal sensing by applying driving signals to the second electrodes 403 in the order of the electrode 403a, the electrode 403b, . . . , the electrode 403h. Next, the electronic device 101 may perform vertical sensing by applying a driving signal to the electrode 401b and perform horizontal sensing by applying driving signals to the second electrodes 403 in the order of the electrode 403a, the electrode 403b, . . . , the electrode 403h. Next, the electronic device 101 may perform vertical sensing on the electrode 401c and the electrode 401d, and may perform horizontal sensing on the second electrodes 403. According to an embodiment, the electronic device 101 may detect the position of the object on the touch screen (e.g., the display 210), based on the change in the self-capacitance detected for the first electrodes 401 and/or the second electrodes 403. For example, if the object is positioned near the point where the electrode 401c and the electrode 403c intersect, the degree of change in the self-capacitance of the electrode 401c and the self-capacitance of the electrode 403c may be relatively greater than the degree of change in the self-capacitance of the surrounding electrodes and/or may exceed a preset threshold magnitude. Based on identifying that the degree of change in the self-capacitance of the electrode 401c and the electrode 403c is relatively greater than the degree of change in the self-capacitance of the surrounding electrodes and/or exceeds the preset threshold magnitude, the electronic device 101 may identify that coordinates (e.g., two-dimensional coordinates on the touch screen) of the object positioned around the touch screen (e.g., the display 210) are positioned at the point where the electrode 401c and the electrode 403c intersect.

According to another embodiment, when the first electrodes 401 are set as TX electrodes and the second electrodes 403 are set as RX electrodes, the electronic device 101 may apply a driving signal to each of the first electrodes 401 and may detect a change in the mutual capacitance of at least some of the first electrodes 401 and at least some of the second electrodes 403, based on the electrical signal received from each of the second electrodes 403. The electronic device 101 may control a driving circuit to apply a driving signal to each of the first electrodes 401 simultaneously or sequentially. For example, switches may be disposed between the driving circuit and the first electrodes 401, respectively, and the electronic device 101 may sequentially apply a driving signal to each of the first electrodes 401 by sequentially controlling the switches to be turned on. The electronic device 101 may receive an electrical signal from each of the second electrodes 403 simultaneously or sequentially while a driving signal is applied to any one (e.g., the electrode 401a) of the first electrodes 401. As a specific example, the electronic device 101 may apply driving signals to the first electrodes 401 in the order of the electrode 401a, the electrode 401b, the electrode 401c, and the electrode 401d, and may receive an electrical signal from each of the electrode 403a, the electrode 403b, the electrode 403c, the electrode 403d, the electrode 403e, the electrode 403f, the electrode 403g, and the electrode 403h. In this case, the electronic device 101 may receive electrical signals from the second electrodes 403 in the order of the electrode 403a, the electrode 403b, . . . , the electrode 403h while setting the electrode 401a as a TX electrode and applying a driving signal. Next, the electronic device 101 may receive electrical signals from the second electrodes 403 in the order of the electrode 403a, the electrode 403b . . . , the electrode 403h while setting the electrode 401b as a TX electrode and applying a driving signal. Next, the electronic device 101 may receive electrical signals from the second electrodes 403 in the order of the electrode 403a, the electrode 403b, . . . , the 403h while setting the electrode 401b as a TX electrode and applying a driving signal. The electronic device 101 may apply driving signals to the first electrodes 401, may receive electrical signals from the second electrodes 403, and may detect a change in mutual capacitance between at least some of the first electrodes 401 and at least some of the second electrodes 403. The electronic device 101 may detect the position of the object on the touch screen (e.g., the display 210), based on the change in the mutual capacitance detected for the first electrodes 401 and/or the second electrodes 403. For example, if the object (not shown) is positioned near the point where the electrode 401c and the electrode 403c intersect, the degree of change in the mutual capacitance formed between the electrode 401c and the electrode 403c identified based on the electrical signal received from the electrode 403c while the driving signal is applied to the electrode 401c may be relatively greater than the degree of change in the mutual capacitance formed between the peripheral electrodes and/or may exceed a preset threshold magnitude. Based on identifying that the degree of change in the mutual capacitance between the electrode 401c and the electrode 403c is relatively greater than the degree of change in the mutual capacitance of the surrounding electrodes and/or exceeds the preset threshold magnitude, the electronic device 101 may identify that coordinates (e.g., two-dimensional coordinates on the touch screen) of the object positioned around the touch screen (e.g., the display 210) are positioned at the point where the electrode 401c and the electrode 403c intersect. According to another embodiment, the first electrodes 401 are set as RX electrodes and the second electrodes 403 are set as TX electrodes and, in this case, the electronic device 101 may apply a driving signal to each of the second electrodes 403 and may detect a change in the mutual capacitance of at least some of the first electrodes 401 and at least some of the second electrodes 403, based on the electrical signal received from each of the first electrodes 401.

As described above, the electronic device 101 may measure a change in self-capacitance and/or a change in mutual capacitance of the first electrodes 401 and/or the second electrodes 403 to identify two-dimensional coordinates of an object positioned around the touch screen (e.g., the display 210). The electronic device 101 may identify the height (e.g., the vertical distance) at which the object is positioned from the touch screen (e.g., the display 210), based on the self-capacitance of the first electrodes 401 and/or the second electrodes 403 and/or the magnitude of the change in mutual capacitance. Accordingly, the electronic device 101 may identify three-dimensional coordinates of the object (e.g., three-dimensional coordinates obtained by combining the two-dimensional coordinates on the touch screen and the height from the touch screen). The electronic device 101 may identify, based on the identified three-dimensional coordinates, a touch input to the first area or the second area, or an input on the space formed by the first area and the second area. The electronic device 101 may control the screen displayed on the first area or the second area based on the identified touch input to the first area or the second area. The electronic device 101 may perform an operation corresponding to multi-touch, based on the identified touch inputs to the first area and the second area. The electronic device 101 may control the screen displayed on the first area and/or the second area or an external electronic device (e.g., the electronic device 102 or 104 of FIG. 1) based on the identified input on the space. The electronic device 101 may identify the user's gesture, based on the identified touch input or input on the space, and may perform the designated operation corresponding to the identified gesture.

According to an embodiment, the electronic device 101 may identify, the position of the object by measuring a change in the self-capacitance of the electrodes or a change in the mutual capacitance of the electrodes for one sensor layer (e.g., the sensor layer 400). According to an embodiment, the electronic device 101 may identify the position of the object by measuring both a change in self-capacitance and a change in mutual capacitance of the electrodes for one sensor layer (e.g., the sensor layer 400). According to an embodiment, the electronic device 101 may include a plurality of sensor layers (e.g., the sensor layer 400) to measure a change in the self-capacitance of the electrodes for the first sensor layer and/or measure a change in the mutual capacitance for the second sensor layer, thereby identifying the location of the object. According to an embodiment, the electronic device 101 may identify the position of the object by measuring a change in the mutual capacitance of the electrodes for the sensor layer 400, and may identify the position of the object by additionally measuring a change in the self-capacitance of the electrodes for a portion (e.g., a portion corresponding to the folding area 360 of FIG. 3A) of the sensor layer 400.

Referring to (a) of FIG. 4 illustrates the shape of the sensor layer 400 when the electronic device 101 is in the unfolded state (e.g., the state of FIG. 3A). (b) of FIG. 4 illustrates the shape of the sensor layer 400 when the electronic device 101 is in the intermediate state.

Referring to (a) and (b) of FIG. 4, the foldable housing (e.g., the foldable housing 382 of FIG. 3C) of the electronic device 101 may be rotated about the folding axis A-A'. According to an embodiment, when the first housing (e.g., the first housing 310 of FIG. 3A) and/or the second housing (e.g., the second housing 320 of FIG. 3A) of the electronic device 101 are rotated in directions opposite to each other about the folding axis A-A' in the unfolded state (e.g., the state of FIG. 3A), at least a portion of the sensor layer 400 may be folded (or bent) from the shape of FIG. 4(a) to the shape of FIG. 4(b). According to an embodiment, when the first housing (e.g., the first housing 310 of FIG. 3A) and/or the second housing (e.g., the second housing 320 of FIG. 3A) of the electronic device 101 are rotated in opposite directions about the folding axis A-A' in the intermediate state (or the folded state (e.g., the state of FIG. 3B)), at least a portion of the sensor layer 400 may be unfolded (or opened) from the shape of FIG. 4(b) to the shape of FIG. 4(a). According to an embodiment, the upper portion (hereinafter, referred to as the first portion) of the folding axis A-A' may be disposed at a position corresponding to the first area exposed through the first surface (e.g., the first surface 311 of FIG. 3A), and the lower portion (hereinafter, referred to as the second portion) of the folding axis A-A' may be disposed at a position corresponding to the second area exposed through the first surface (e.g., the second surface 312 of FIG. 3A).

According to an embodiment, the position of the object close to the first area may be detected through the upper portion of the folding axis A-A' of the sensor layer 400, and the position of the object close to the second area may be detected through the lower portion of the folding axis A-A' of the sensor layer 400. According to an embodiment, as illustrated in FIG. 4(a), in a state in which the first portion and the second portion of the sensor layer 400 are parallel to each other (e.g., in a state in which substantially the same plane is formed), coordinates (e.g., two-dimensional coordinates or three-dimensional coordinates) of the object on the first portion or the second portion of the sensor layer 400 may be identified. According to an embodiment, as illustrated in FIG. 4(b), when the first portion and the second portion of the sensor layer 400 are not parallel to each other (e.g., a state in which a predetermined angle is formed), the three-dimensional coordinate information may be identified based on the coordinates (e.g., two-dimensional coordinates or three-dimensional coordinates) of the object identified in each of the first portion and the second portion of the sensor layer 400, which is described in more detail with reference to the drawings to be described below.

In describing various embodiments of the disclosure, the direction from the left end of the folding axis A-A' to the right end is set as the axis in the horizontal direction of the sensor layer 400, the vertical direction from the left end of the folding axis A-A' to the sensor layer 400 is set as the axis in the vertical direction of the sensor layer 400, and the vertical direction from the sensor layer 400 is set as the axis in the height direction of the sensor layer 400.

Figure 5A:
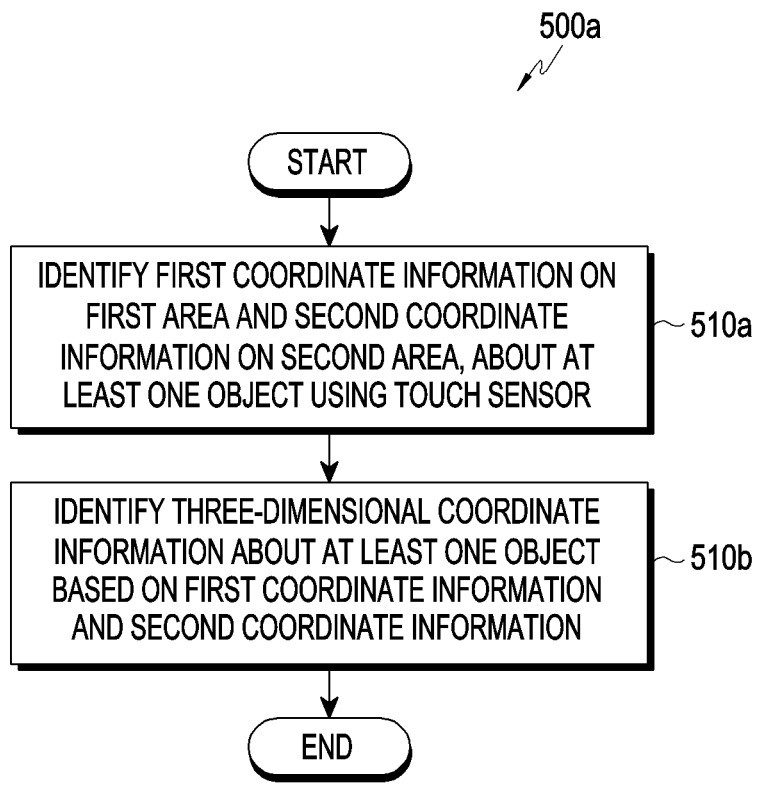
FIG. 5A is a flowchart illustrating a method in which an electronic device identifies three-dimensional coordinate information about an object based on coordinate information on a first area and a second area of a touchscreen in an intermediate state according to an embodiment.

FIG. 5A is a flowchart 500a illustrating a method in which an electronic device (e.g., the electronic device 101 of FIG. 1) identifies three-dimensional coordinate information about an object based on coordinate information on a first area and a second area of a touchscreen (e.g., the display 330 of FIG. 3A) in an intermediate state.

According to an embodiment, in operation 510a, the electronic device 101 may identify first coordinate information on the first area and second coordinate information on the second area of the at least one object using a touch sensor (e.g., the touch sensor 251 of FIG. 2). According to an embodiment, in the intermediate state, if at least one object is positioned on the space formed by the first surface (e.g., the first surface 311 of FIG. 3A) (or first area) and the third surface (e.g., the third surface 321 of FIG. 3A) (or second area) of the touchscreen (e.g., the display 330), the electronic device 101 may identify first coordinate information (e.g., two-dimensional coordinate value and/or third-dimensional coordinate value) on the first area of the at least one object based on the electrical signal from at least some of the electrodes disposed in the first portion of the sensor layer 400 corresponding to the first area and identify second coordinate information (e.g., two-dimensional coordinate value and/or three-dimensional coordinate value) on the second area of the at least one object based on the electrical signal from at least some of the electrodes disposed in the second portion of the sensor layer 400 corresponding to the second area. According to an embodiment, the coordinate value of any one of the first coordinate information or the second coordinate information may be changed to the coordinate value on the predesignated coordinate system. For example, the electronic device 101 may change at least one coordinate value through a pre-stored change method. For example, the electronic device 101 may change any one coordinate value of the first coordinate information or the second coordinate information to a coordinate value on a predesignated coordinate system, based on a predesignated angle or an angle between the first surface (e.g., the first surface 311 of FIG. 3A) and the third surface (e.g., the third surface 321 of FIG. 3A), which is described in more detail with reference to the drawings to be described below. According to an embodiment, the electronic device 101 may identify the first coordinate information and/or the second coordinate information using a sensor (e.g., a camera, a proximity sensor, an infrared sensor, and/or a ToF sensor) different from the touch sensor 251, or may correct the first coordinate information and/or the second coordinate information obtained using the touch sensor 251, which is described in more detail with reference to the drawings to be described below.

According to an embodiment, in operation 510b, the electronic device 101 may identify three-dimensional coordinate information about at least one object, based on the first coordinate information and the second coordinate information. According to an embodiment, the electronic device 101 may identify, e.g., three-dimensional coordinate information based on an operation result using the first coordinate information and the second coordinate information. According to an embodiment, the electronic device 101 may apply a weight to at least one (or any one) of the first coordinate information or second coordinate information and identify the three-dimensional coordinate information based on the operation result, which is described in detail with reference to the drawings described below. According to an embodiment, the electronic device 101 may correct three-dimensional coordinate information using a sensor (e.g., a camera, a proximity sensor, an infrared sensor, and/or a ToF sensor) different from the touch sensor 251, which is described in more detail with reference to the drawings to be described below.

According to an embodiment, the above-described operations may be performed by the touch sensor IC 253 and/or a processor (e.g., the processor 120 of FIG. 1). For example, the touch sensor IC 253 may identify the three-dimensional coordinate information based on the first and second coordinate information and may provide the three-dimensional coordinate information to the processor (e.g., the processor 120 of FIG. 1). As another example, the touch sensor IC 253 may provide first and second coordinate information to the processor 120, and the processor 120 may identify three-dimensional coordinate information based on the provided first and second coordinate information.

Figure 5B:
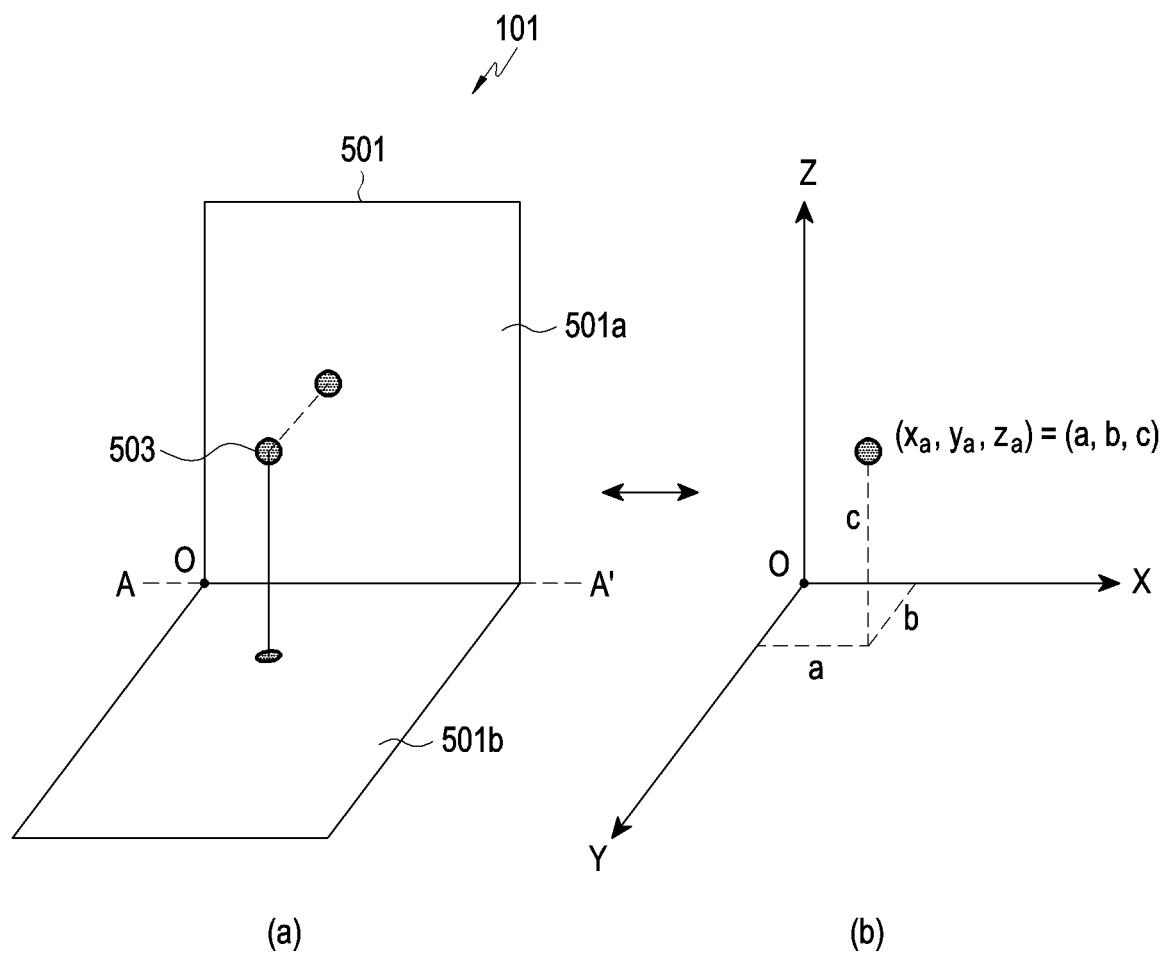
FIG. 5B is a view illustrating a method in which an electronic device identifies coordinate information on a second area of a touchscreen in an intermediate state according to an embodiment.
Figure 5C:
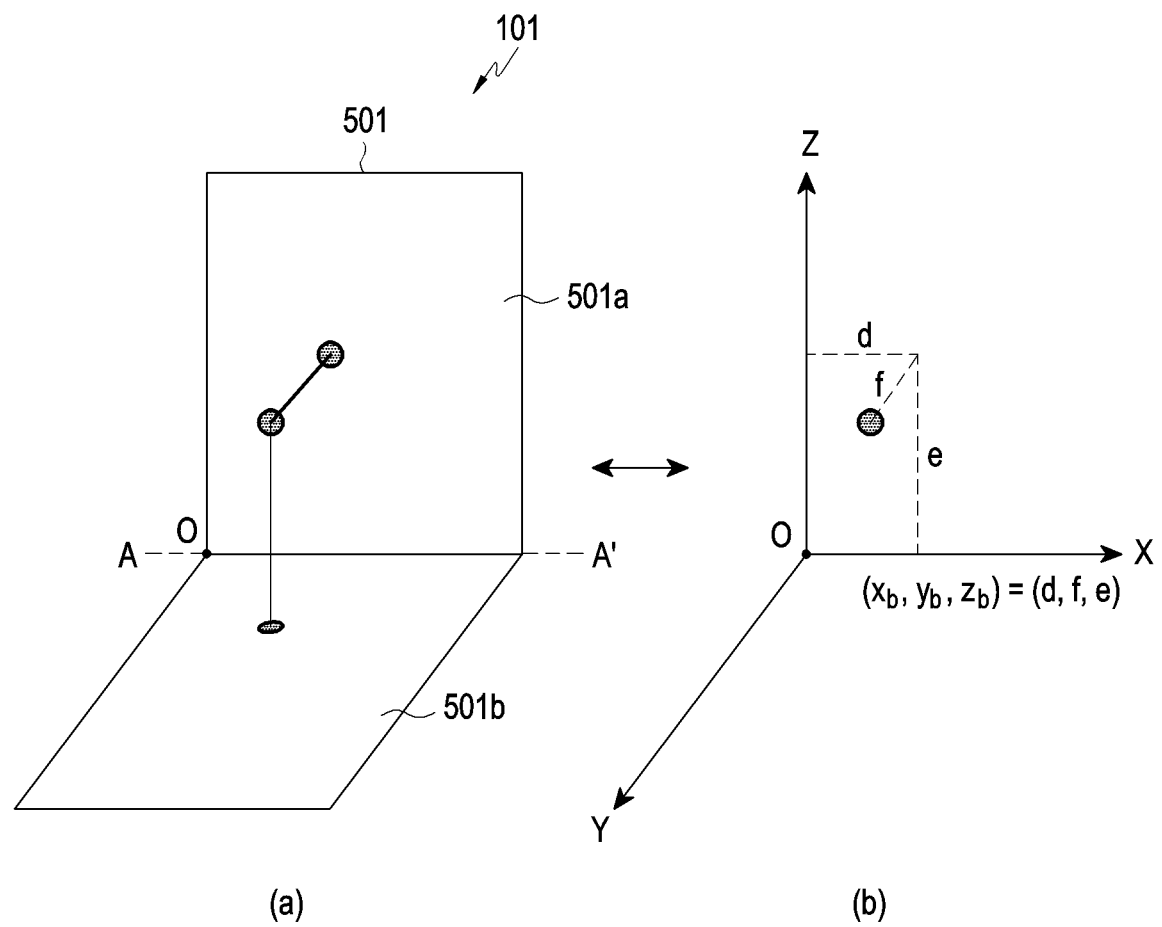
FIG. 5C is a view illustrating a method in which an electronic device identifies first coordinate information on a first area of a touchscreen in an intermediate state according to an embodiment.

FIG. 5B is a view illustrating a method in which an electronic device 101 identifies coordinate information on a second area 501b of a touchscreen 501 (e.g., the display 330 of FIG. 3A) in an intermediate state according to an embodiment. FIG. 5C is a view illustrating a method in which an electronic device (e.g., the electronic device 101 of FIG. 1) identifies first coordinate information on a first area 501a of a touchscreen 501 in an intermediate state according to an embodiment.

According to an embodiment, at least one object (e.g., the user's finger and/or a stylus pen) may be positioned in a space formed by the first surface (e.g., the first surface 311 of FIG. 3A) and the third surface (e.g., the third surface 321 of FIG. 3A). For convenience of description, in FIGS. 5B and 5C, it is assumed that an object 503 is positioned in a space formed by the first surface 311 and the third surface 321. Further, for convenience of description, in FIGS. 5B and 5C, it is assumed that the angle between the first surface 311 (or the first area 501a) and the third surface 321 (or the second area 501b) is 90 degrees.

Referring to FIG. 5B(a), the electronic device 101 detects a change in capacitance (e.g., self-capacitance and/or mutual capacitance) of electrodes disposed in a portion of a sensor layer (e.g., the sensor layer 400 of FIG. 4) disposed at a position corresponding to the second area 501b, based on the object 503 being positioned in the space formed by the first surface 311 (or the first area 501a) and the third surface 321 (or the second area 501b), and may identify a second coordinate value (e.g., the coordinate value of the object 503 for the second area 501b) on the second area 501b, based on the detected change. According to an embodiment, the electronic device 101 may identify the second coordinate value as the second coordinate information.

FIG. 5B(b) illustrates that the position of the object 503 is on the coordinate system with respect to the third surface 321 (or the second area 501b). In the coordinate system illustrated in FIG. 5B(b), the left end of the folding axis A-A' may be expressed as the origin O, the direction of the folding axis A-A' may be expressed as the X-axis, the vertical direction of the third surface 321 (or the second area 501b) may be expressed as the Y-axis, and the vertical direction of the first surface 311 (or the first area 501a) may be expressed as the Z-axis. According to an embodiment, if the object 503 is positioned at the point a in the horizontal direction, b in the vertical direction, and c in the height direction from the third surface 321 (or the second area 501b), the second coordinate value (e.g., [horizontal, vertical, height]) with respect to the third surface 321 (or the second area 501b) may be identified as [a, b, c]. According to an embodiment, the identified second coordinate value may be identified as the second coordinate information.

Referring to FIG. 5C(a), the electronic device 101 detects a change in capacitance (e.g., self-capacitance and/or mutual capacitance) of electrodes disposed in a portion of the sensor layer 400 disposed at a position corresponding to the first area 501a, based on the object 503 being positioned in the space formed by the first surface 311 (or the first area 501a) and the third surface 321 (or the second area 501b), and may identify a first coordinate value (e.g., [horizontal, vertical, height]) with respect to the first surface 311 (or the first area 501a), based on the detected change.

Referring to FIG. 5C(b), according to an embodiment, if the object 503 is positioned at the point d in the horizontal direction, e in the vertical direction, and f in the height direction from the first surface 311, a coordinate value (e.g., [horizontal, vertical, height]) with respect to the first surface 311 (or the first area 501a) may be identified as [d, e, f]. According to an embodiment, the electronic device 101 may identify the first coordinate value as the first coordinate information. According to an embodiment, the electronic device 101 may change the first coordinate value to a coordinate value on the coordinate system with respect to the third surface 321 (or the second area 501b), based on the angle between the first surface 311 (or the first area 501a) and the third surface 321 (or the second area 501b) being a predesignated angle (e.g., 90 degrees). For example, the electronic device 101 may identify that the angle between the first surface 311 (or the first area 501a) and the third surface 321 (or the second area 501b) is a predesignated angle (e.g., 90 degrees) using at least one sensor (e.g., an angle sensor). Based on the angle between the first surface 311 (or the first area 501a) and the third surface 321 (or the second area 501b) being the predesignated angle (e.g., 90 degrees), the electronic device 101 may determine the vertical value e of the first coordinate value as the Z value and the height direction value f as the Y value, and may change the coordinate value of the first coordinate information to [d, f, e], which is the coordinate value on the coordinate system with respect to the third surface 321 (or the second area 501b). The electronic device 101 may identify the changed first coordinate value as the first coordinate information. According to an embodiment, the X value a of the first coordinate information and the X value d of the second coordinate information may be related (e.g., correspond) to each other (e.g., may be the same within a designated error range).

According to an embodiment, the electronic device 101 may identify three-dimensional coordinate information (e.g., three-dimensional coordinate information on the space formed by the first surface 311 and the third surface 321) about the object 503, based on the second coordinate information (e.g., [a, b, c]) and the first coordinate information (e.g., [d, f, e]). According to an embodiment, the coordinate value of the object 503 in the height direction from each surface (e.g., the first surface 311 or the third surface 321) may be less accurate in measurement than the coordinate value of the object 503 in the horizontal direction and/or the vertical direction on each surface (e.g., the first surface 311 or the third surface 321). According to an embodiment, the electronic device 101 may identify the X value a and the Y value b from the second coordinate information, may identify the X value d and the Z value e from the first coordinate information, and may identify [a, b, e], [d, b, e], or [(a+d)/2, b, e] as three-dimensional coordinate information about the object 503 (e.g., a three-dimensional coordinate value on a coordinate system with respect to the third surface 321 (or the second area 501b)). According to an embodiment, the electronic device 101 may identify the three-dimensional coordinate information about the object 503, based on the X values, the Y values, and the Z values of the first coordinate information and the second coordinate information, which is described in more detail with reference to the drawings to be described below.

In the above-described paragraphs, it has been described that each of the first coordinate information and the second coordinate information includes a three-dimensional coordinate value, but according to implementation, the electronic device 101 may identify a two-dimensional coordinate value (e.g., [horizontal, vertical]=[d, e]) on the first area 501a of the object 503, identify a two-dimensional coordinate value (e.g., [horizontal, vertical]=[a, b]) on the second area 501b of the object 503, and identify [a, b, e], [d, b, e], or [(a+d)/2, b, e] as the three-dimensional coordinate information about the object 503 based on the identified two-dimensional coordinate values.

Figure 6:
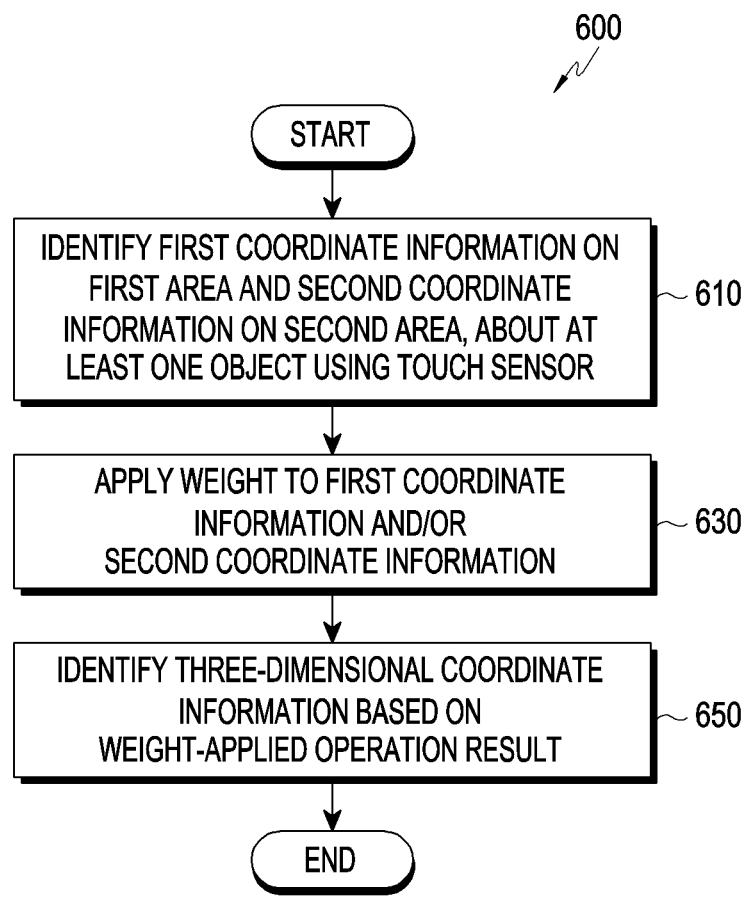
FIG. 6 is a flowchart illustrating a method in which an electronic device identifies three-dimensional coordinate information by applying a weight to first coordinate information and/or second coordinate information in an intermediate state according to an embodiment.

FIG. 6 is a flowchart 600 illustrating a method in which an electronic device (e.g., the electronic device 101 of FIG. 1) identifies three-dimensional coordinate information by applying a weight to first coordinate information and/or second coordinate information in an intermediate state according to an embodiment.

According to an embodiment, in operation 610, the electronic device 101 may identify first coordinate information on a first area (e.g., the first area 501*a* of FIG. 5B) and second coordinate information on a second area (e.g., the second area 501*b* of FIG. 5B) of at least one object using a touch sensor (e.g., the touch sensor 251 of FIG. 2).

According to an embodiment, in operation 630, the electronic device 101 may apply a weight to the first coordinate information and/or the second coordinate information.

According to an embodiment, in operation 650, the electronic device 101 may identify three-dimensional coordinate information, based on the operation result obtained by applying the weight.

For example, the electronic device 101 may identify the three-dimensional coordinate information about the object (e.g., the object 503 of FIG. 5B) by applying a low weight to the coordinate value of the object 503 in the height direction from each surface (e.g., the first surface 311 or the third surface 321). Referring to FIGS. 5B and 5C, a low weight may be applied to the height direction value f for the first surface 311 (or the first area 501*a*) and the height direction value c for the third surface 321 (or the second area 501*b*). For example, the electronic device 101 may identify three-dimensional coordinate information $[x_P, y_P, z_P]$ based on Equations 1 to 3.

$$[x_p \; y_p \; z_p]^T = W_1 * [x_a \; y_a \; z_a]^T + W_2 * [x_b \; y_b \; z_b]^T \quad \text{[Equation 1]}$$

$$W_1 = \begin{bmatrix} 0.5 & 0 & 0 \\ 0 & a & 0 \\ 0 & 0 & 1-b \end{bmatrix}, (0 \le a, b < 1) \quad \text{[Equation 2]}$$

$$W_2 = \begin{bmatrix} 0.5 & 0 & 0 \\ 0 & 1-a & 0 \\ 0 & 0 & b \end{bmatrix}, (0 \le a, b < 1) \quad \text{[Equation 3]}$$

In Equation 1, $W_1$ and $W_2$ may be described as weights (or a weight matrix). In Equation 1, "T" may denote a transpose operator. $[x_a, y_a, z_a]$ may denote the second coordinate information (e.g., the coordinate value with respect to the third surface 321 (or the second area 501*b*)) of FIG. 5B, and $[x_b, y_b, z_b]$ may denote the first coordinate information (e.g., the coordinate value with respect to the first surface 311 (or the first area 501*a*)) of FIG. 5C.

Figure 7:
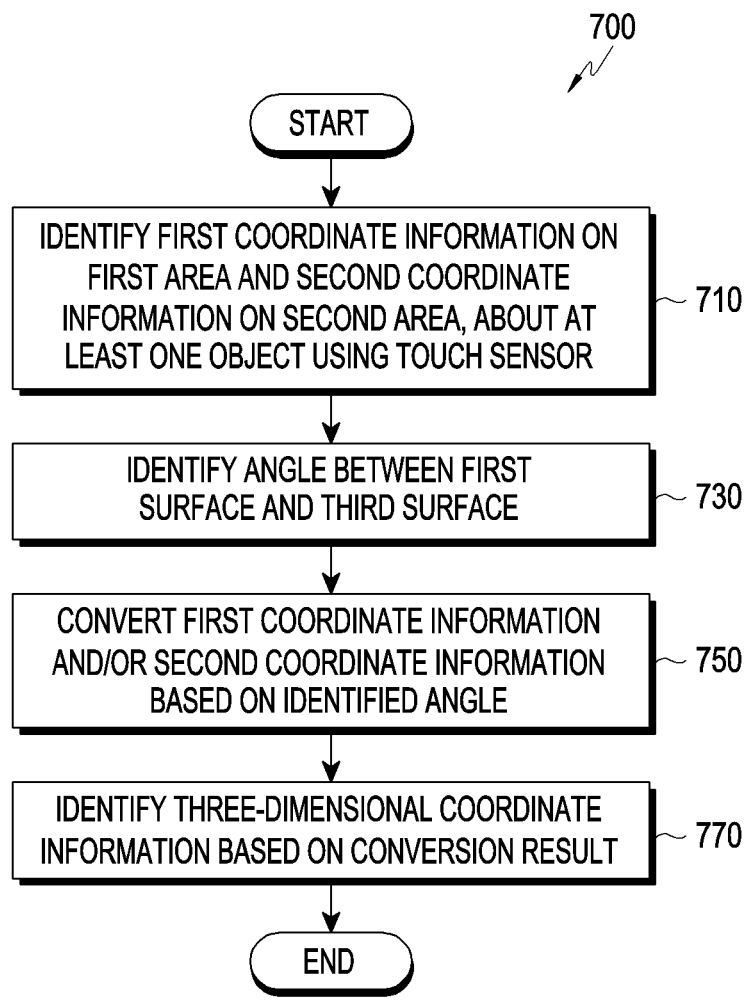
FIG. 7 is a flowchart illustrating a method in which an electronic device identifies three-dimensional coordinate information based on an angle between a first surface and a third surface in an intermediate state according to an embodiment.
Figure 8A:
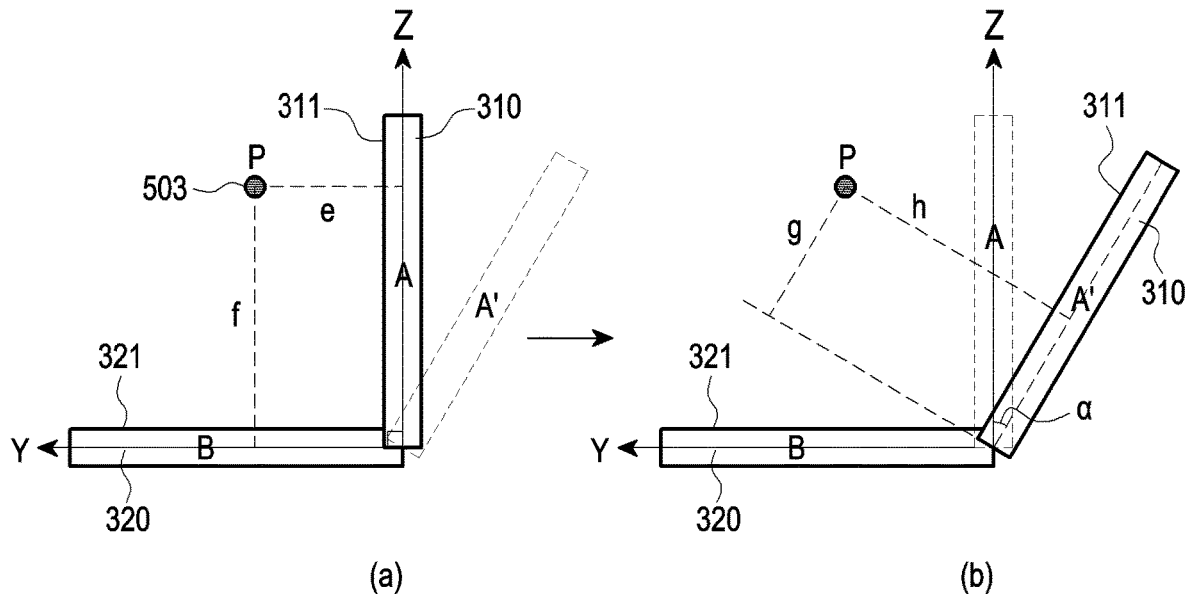
FIG. 8A is a view illustrating a method in which an electronic device identifies three-dimensional coordinate information based on an angle between a first surface and a third surface according to an embodiment.
Figure 8B:
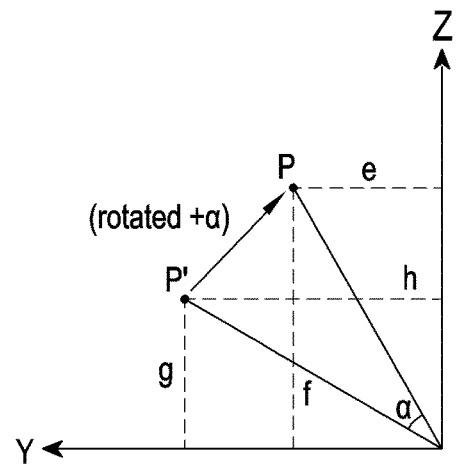
FIG. 8B is a view illustrating a method in which an electronic device identifies three-dimensional coordinate information based on an angle between a first surface and a third surface according to an embodiment.

FIG. 7 is a flowchart 700 illustrating a method in which an electronic device (e.g., the electronic device 101 of FIG. 1) identifies three-dimensional coordinate information based on an angle between a first surface (e.g., the first surface 311 of FIG. 3A) and a third surface (e.g., the third surface 321 of FIG. 3A) in an intermediate state according to an embodiment. FIG. 8A is a view illustrating a method in which an electronic device 101 identifies three-dimensional coordinate information based on an angle between a first surface 311 and a third surface 321 according to an embodiment. FIG. 8B is a view illustrating a method in which an electronic device 101 identifies three-dimensional coordinate information based on an angle between a first surface 311 and a third surface 321 according to an embodiment. Hereinafter, the flowchart 70) of FIG. 7 is described with reference to FIGS. 8A and 8B.

According to an embodiment, in operation 710, the electronic device 101 may identify first coordinate information on a first area (e.g., the first area 501*a* of FIG. 5B) and second coordinate information on a second area (e.g., the second area 501*b* of FIG. 5B) of at least one object using a touch sensor (e.g., the touch sensor 251 of FIG. 2).

According to an embodiment, in operation 730, the electronic device 101 may identify the angle between the first surface 311 and the third surface 321. For example, the electronic device 101 may identify the angle between the first surface 311 (or the first area 501*a*) and the third surface 321 (or the second area 501*b*) using at least one sensor (e.g., an angle sensor).

According to an embodiment, in operation 750, the electronic device 101 may convert the first coordinate information and/or the second coordinate information, based on the identified angle.

Referring to FIG. 8A(a), the first surface 311 of the first housing 310 of the electronic device 101 may be parallel to the Z axis, the third surface 321 of the second housing 320 may be parallel to the Y axis, and the first surface 311 and the third surface 321 may be perpendicular to each other. If the first surface 311 of the first housing 310 of the electronic device 101 is inclined clockwise by a predetermined angle $\alpha$, as illustrated in FIG. 8A(b), it may be identified that the angle between the first surface 311 and the third surface 321 is 90°+$\alpha$. According to an embodiment, when the object 503 is positioned at e in the Y-axis directions and f in the Z-axis direction, in the state of the electronic device 101 illustrated in (b) of FIG. 8A, the object 503 may be measured as positioned at g in the vertical direction and h in the height direction with respect to the first surface 311 so that the electronic device 101 may identify that the coordinate value (e.g., the coordinate value with respect to the first surface 311) of the first coordinate information is $[x_n, h, g]$. According to an embodiment, the electronic device 101 may identify that the angle between the first surface 311 and the third surface 321 is 90°+$\alpha$, and may change, e.g., the coordinate value $[x_n, h, g]$ of the first coordinate information based on Equations 4 and 5.

$$[x_a \; y'_a \; z'_a]^T = R \cdot [x_a \; y_a \; z_a]^T \quad \text{[Equation 4]}$$

In Equation 4, $[x_a, y_a, z_a]$ may denote the coordinate value P' before the change of the first coordinate information, $[x_a, y'_a, z'_a]$ may denote the coordinate value P after the change of the first coordinate information, and R may denote the rotation matrix that changes the measured coordinate value P' of the first coordinate information. In FIGS. 8A and 8B, $y_a$ may be h, $z_a$ may be g, $y'_a$ may be e, and $z'_a$ may be f.

Referring to FIG. 8B, the coordinates P' of the object 503 measured in the state (b) of FIG. 8A may be interpreted as measured by rotating the actual coordinates P of the object 503 by $-\alpha$. According to an embodiment, the electronic device 101 may rotate the measured coordinate value P' by $+\alpha$, based on the rotation matrix R of Equation 5, and may change the coordinate value P on the coordinate system with respect to the third surface 321.

$$R = \begin{bmatrix} 1 & 0 & 0 \\ 0 & \cos(\alpha) & -\sin(\alpha) \\ 0 & \sin(\alpha) & \cos(\alpha) \end{bmatrix} \quad \text{[Equation 5]}$$

According to an embodiment, based on Equations 4 and 5, the electronic device 101 may change the measured coordinate value P' to the coordinate value P on the coordinate system with respect to the third surface 321, and may identify the changed coordinate value P as the first coordinate information.

According to an embodiment, in a ninth operation 770, the electronic device 101 may identify three-dimensional coordinate information, based on the conversion result. For example, the electronic device 101 may identify the three-dimensional coordinate information based on the first coordinate information and the second coordinate information including the changed coordinate value P.

Figure 9:
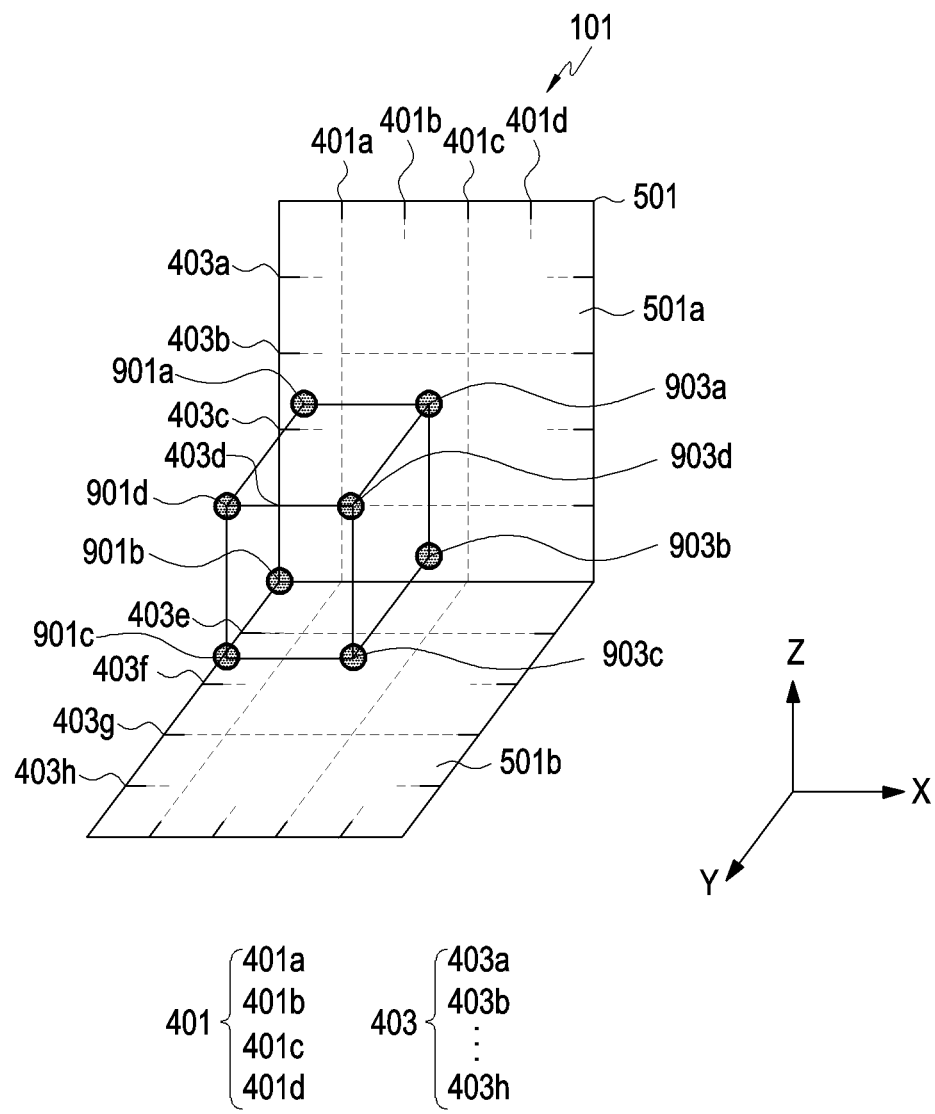
FIG. 9 is a view illustrating a method in which an electronic device identifies three-dimensional coordinate values of a plurality of objects based on coordinate information on a first area and a second area of a touchscreen in an intermediate state according to an embodiment.

FIG. 9 is a view illustrating a method in which an electronic device (e.g., the electronic device 101 of FIG. 1) identifies three-dimensional coordinate values of a plurality of objects through sensing in a horizontal direction and/or vertical direction for a touch sensor (e.g., the touch sensor 251 of FIG. 2) in an intermediate state according to an embodiment.

According to an embodiment, a plurality of objects may be positioned in a space formed by the first surface (e.g., the first surface 311 of FIG. 3A) (or the first area 501a) and the third surface (e.g., the third surface 321 of FIG. 3A) (or the second area 501b) of the touchscreen 501. For example, the plurality of objects may include the user's fingers and/or a stylus pen.

Referring to FIG. 9, eight objects 901a. 901b, 901c, 901d, 903a, 903b, 903c, and 903d may be positioned in a space formed by the first area 501a and the second area 501b. In FIG. 9, it is assumed that the eight objects 901a, 901b, 901c, 901d, 903a, 903b, 903c, and 903d are positioned at respective vertices of the cube parallel to the first area 501a and the second area 501b.

According to an embodiment, the electronic device 101 may identify the respective three-dimensional coordinate values of the plurality of objects 901a, 901b, 901c, 901d, 903a, 903b, 903c, and 903d based on a change in capacitance (e.g., self-capacitance and/or mutual capacitance) of electrodes of a sensor layer (e.g., the sensor layer 400 of FIG. 4) disposed at a position corresponding to the first area 501a and/or the second area 501b.

According to an embodiment, the electronic device 101 may measure the self-capacitance of the electrode 401a, and may sequentially measure the self-capacitance of each of the electrodes 403 in the vertical direction (e.g., the downward direction) for the electrodes 403 in the horizontal direction. Thereafter, the electronic device 101 may measure the self-capacitance of the electrode 401b and sequentially measure the self-capacitance of each electrode 403 in order in the vertical direction for the electrodes 403 in the horizontal direction. Thereafter, the above-described operations may also be performed on the electrodes 401c and 401d.

Referring to FIG. 9, it may be assumed that first objects 901a. 901b. 901c, and 901d are positioned on a surface corresponding to the height direction of an electrode (e.g., the electrode 401a), second objects 903a, 903b, 903c, and 903d are positioned on a surface corresponding to the height direction of the electrode 401c, are positioned in the height direction of the electrode 403b, objects 901b, 901c. 903b, and 903c are positioned in the height direction of the electrode 403d, objects 901a, 901b, 903a, and 903b are positioned in the height direction of the electrode 403e, and object 901c, 901d, 903c, and 903d are positioned in the height direction of the electrode 403g. According to various embodiments, when the self-capacitance of the electrode 401a is measured, four objects 901a, 901b, 901c, and 901d may be detected. Thereafter, when the self-capacitance of the electrode 403b is measured, the four objects 901a, 901d, 903a, and 903d may be sequentially detected. The electronic device 101 may detect the presence of the objects 901a and 901d positioned in the area where the surface corresponding to the height direction of the electrode 401a being measured and the height direction of the electrode 403b intersect. Thereafter, when the self-capacitance of the electrode 403d is measured, the electronic device 101 may sequentially detect four objects 901b, 901c. 903b, and 903c. The electronic device 101 may detect the presence of the objects 901b and 901c positioned in the area where the surface corresponding to the height direction of the electrode 401a being measured and the height direction of the electrode 403b intersect. Thereafter, when the self-capacitance of the electrode 403e is measured, the four objects 901a, 901b, 903a, and 903b may be sequentially detected. The electronic device 101 may detect the presence of the objects 901a and 901b positioned in the area where the surface corresponding to the height direction of the electrode 401a being measured and the height direction of the electrode 403e intersect. Thereafter, when the self-capacitance of the electrode 403g is measured, the four objects 901c, 901d, 903c, and 903d may be sequentially detected. The electronic device 101 may detect the presence of the objects 901c and 901d positioned in the area where the surface corresponding to the height direction of the electrode 401a being measured and the height direction of the electrode 403g intersect. The electronic device 101 may identify the three-dimensional coordinate value of the object 901a based on the measurement result of the electrode 401a, the electrode 403b, and the electrode 403e. The electronic device 101 may identify the three-dimensional coordinate value of the object 901b based on the measurement result of the electrode 401a, the electrode 403d, and the electrode 403e. The electronic device 101 may identify the three-dimensional coordinate value of the object 901c based on the measurement result of the electrode 401a, the electrode 403d, and the electrode 403g. The electronic device 101 may identify the three-dimensional coordinate value of the object 901d based on the measurement result of the electrode 401a, the electrode 403b, and the electrode 403e. According to an embodiment, similar to the second objects 903a. 903b, 903c, and 903c, when the self-capacitance of the electrode 401c is measured, the four objects 903a, 903b, 903c, and 903d may be detected, and then, based on the self-capacitance of the electrode 403b, the electrode 403d, the electrode 403e, and the electrode 403g being measured, the three-dimensional coordinate values of the second objects 903a, 903b, 903c, and 903c may be identified. If the object 901d is positioned in the vertical direction from the first area 501a toward the object 901a and is positioned in the vertical direction from the second area 501b toward the object 901c, the object 901d may be hidden by the object 901a and the object 901c so that the three-dimensional coordinate value may not be accurately measured according to the above-described methods, and the method of supplementing the three-dimensional coordinate value is described in more detail with reference to the drawings to be described below.

In the above-described paragraphs, it has been described that the self-capacitance of the electrodes of the sensor layer 400 is measured to identify three-dimensional coordinate values of the plurality of objects. However, the three-dimensional coordinate values of the objects may be identified by measuring the mutual capacitance of the electrodes of the sensor layer 400 or by measuring both the self-capacitance and the mutual capacitance of the electrodes of the sensor layer 400.

Figure 10:
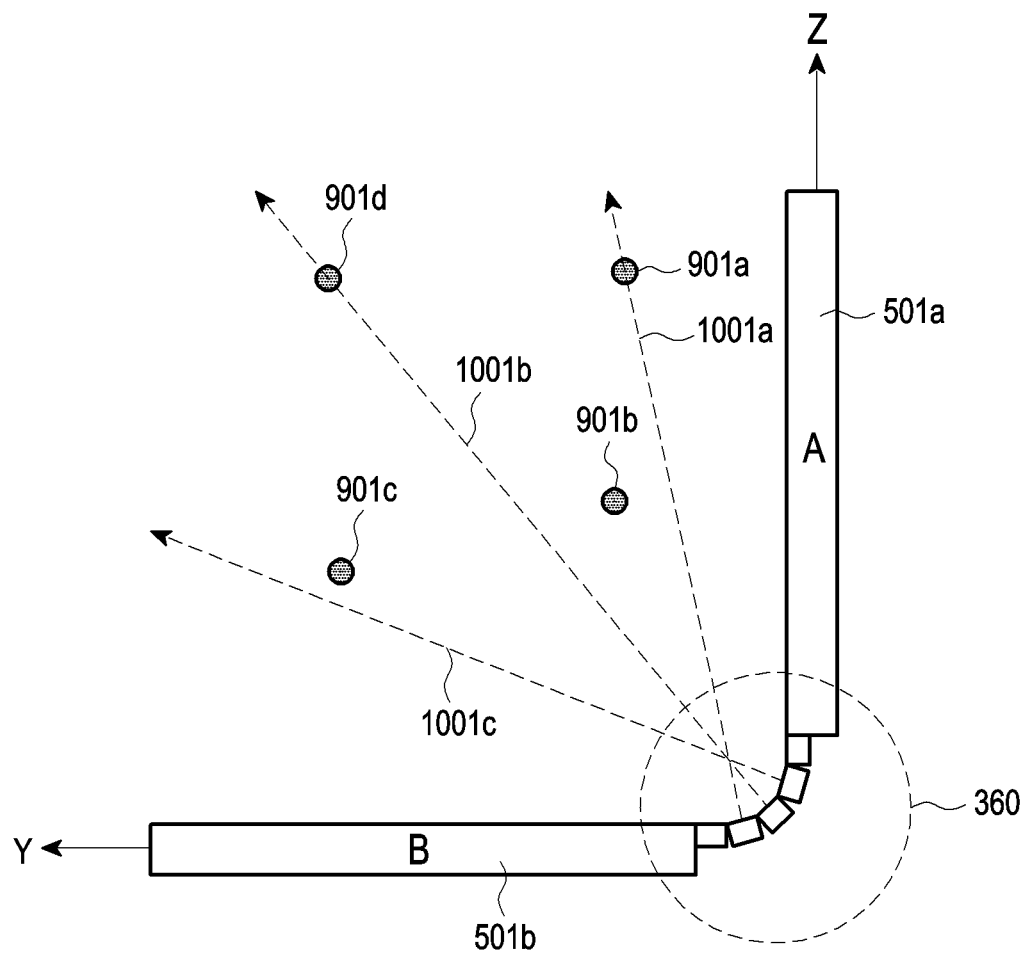
FIG. 10 is a view illustrating a method in which an electronic device identifies three-dimensional coordinate values of an object hidden by a plurality of objects according to an embodiment.

FIG. 10 is a view illustrating a method in which an electronic device (e.g., the electronic device 101 of FIG. 1) identifies three-dimensional coordinate values of objects (e.g., the object 901d or object 903d of FIG. 9) hidden by a plurality of objects according to an embodiment.

According to an embodiment, a touch screen (e.g., the touchscreen 501 of FIG. 5B) may include a folding area 360.

According to an embodiment, when identifying three-dimensional coordinate values of objects (e.g., the object 901d or the object 903d of FIG. 9) hidden by a plurality of objects, the electronic device 101 may use electrodes disposed in a portion (e.g., near the folding axis A-A' of FIG. 4) corresponding to the folding area 360 of the entire area of the sensor layer (e.g., the sensor layer 400 of FIG. 4). For example, referring to FIG. 10, the object 901d may be positioned in the vertical direction from the first area 501a toward the object 901a, and may be positioned in the vertical direction from the second area 501b toward the object 901c, and may be at least partially hidden by the object 901a and the object 901c. According to an embodiment, the electronic device 101 may detect objects disposed in vertical directions (e.g., 1001a, 1001b, and 1001c) from the electrodes by using the electrodes disposed in the portion corresponding to the folding area 360 (e.g., near the folding axis A-A' of FIG. 4). For example, based on the object 901d being positioned in the vertical direction 1001b, the electronic device 101 may identify the position of the object 901d by identifying a change in the self-capacitance of at least one of the electrodes disposed in the portion corresponding to the folding area 360 (e.g., near the folding axis A-A' of FIG. 4). For example, the electronic device 101 may identify position information including the distance of the object 901d from the folding area 360, based on a change in the self-capacitance of at least one electrode among electrodes disposed in the portion corresponding to the folding area 360 (e.g., near the folding axis A-A' of FIG. 4).

According to an embodiment, when identifying three-dimensional coordinate values of objects (e.g., the object 901d or the object 903d of FIG. 9) hidden by the plurality of objects, the electronic device 101 may have a camera (e.g., an under display camera) and/or a ToF sensor disposed under the folding area 360 and/or at least one of the first area 501a or the second area 501b of the entire area of the sensor layer (e.g., the sensor layer 400 of FIG. 4). According to an embodiment, the electronic device 101 may identify the position of the object 901d using the disposed camera and/or ToF sensor.

According to an embodiment, if a plurality of objects (e.g., 901a, 901b, 901c, and 901d) are detected through the sensor layer 400 corresponding to the first area 501a and/or the second area 501b, the electronic device 101 may track displacements of the detected plurality of objects (e.g., 901a, 901b, 901c, and 901d), and when it is identified that the number of the detected plurality of objects decreases in the tracking process, the electronic device 101 may identify the position of the object 901d hidden by two or more of the plurality of objects using the electrodes, camera, proximity sensor, infrared sensor, and/or ToF sensor disposed at the position corresponding to the above-described folding area 360.

Figure 11:
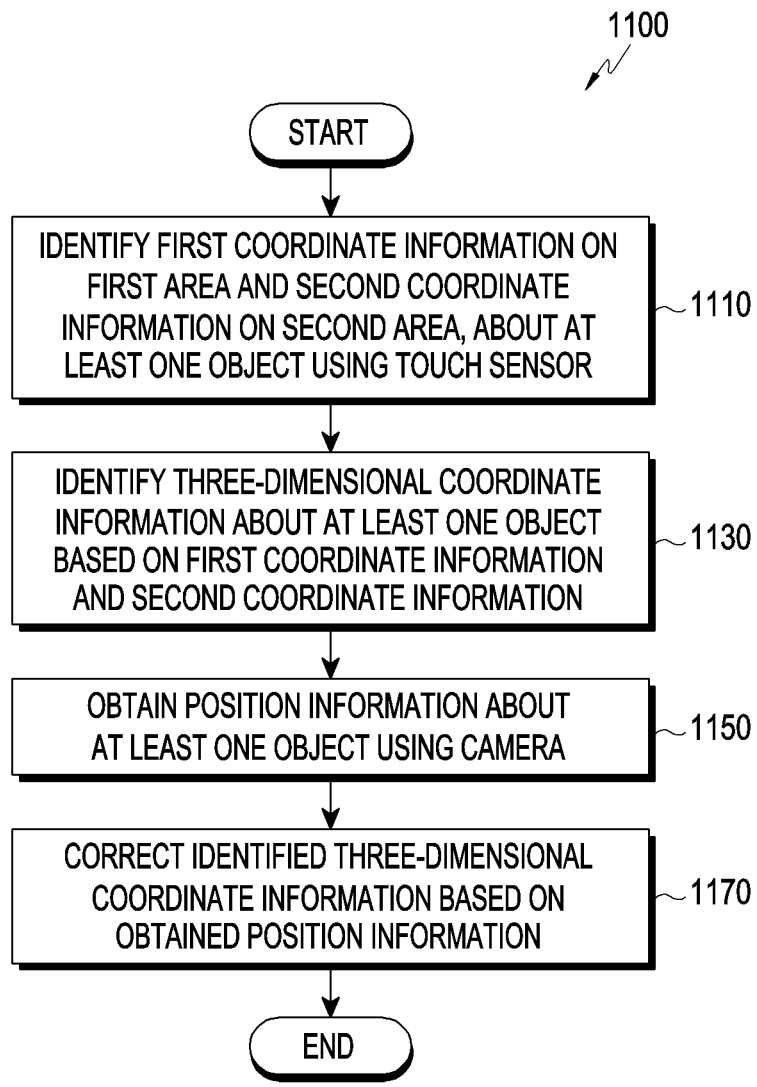
FIG. 11 is a flowchart illustrating a method in which an electronic device corrects three-dimensional coordinate information about an object identified through a touch sensor using a camera according to an embodiment.
Figure 12A:
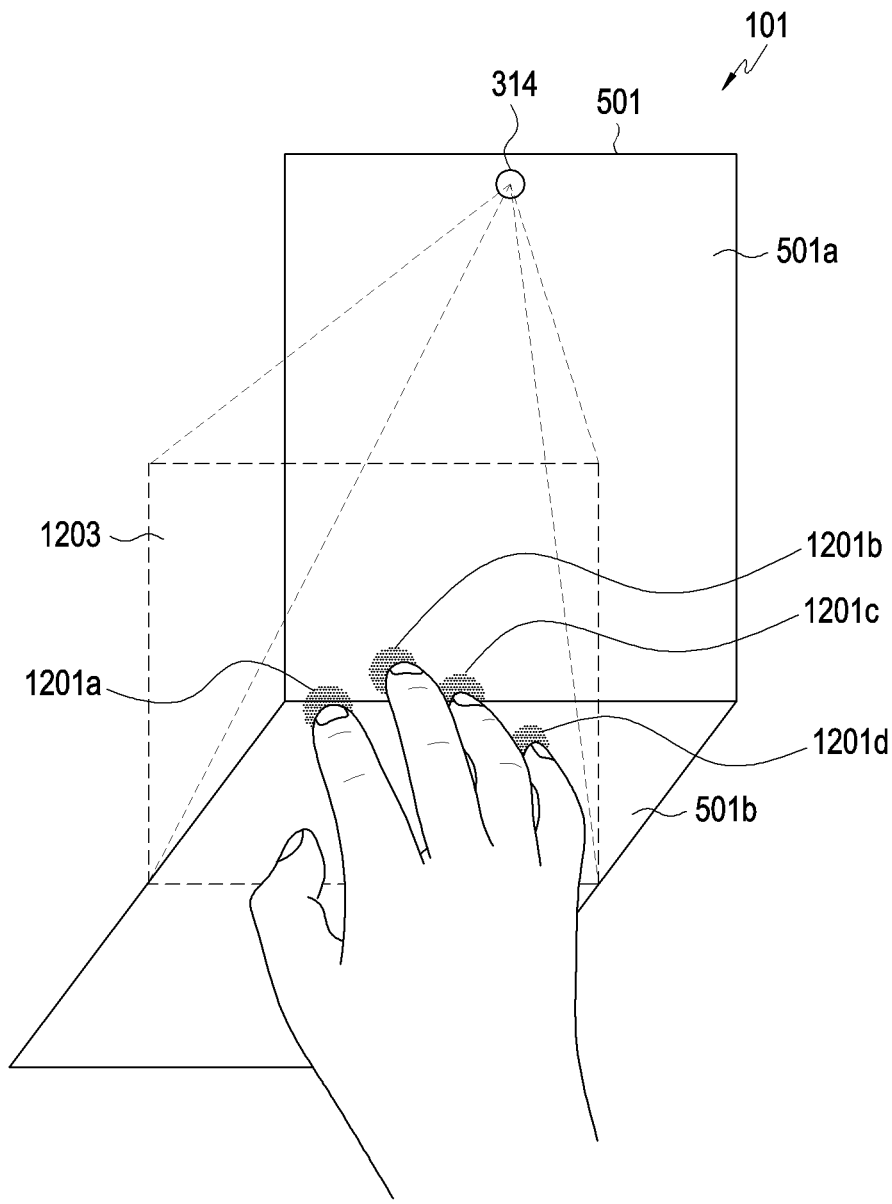
FIG. 12A is a view illustrating a method in which an electronic device corrects three-dimensional coordinate information about an object identified through a touch sensor using a camera according to an embodiment.
Figure 12B:
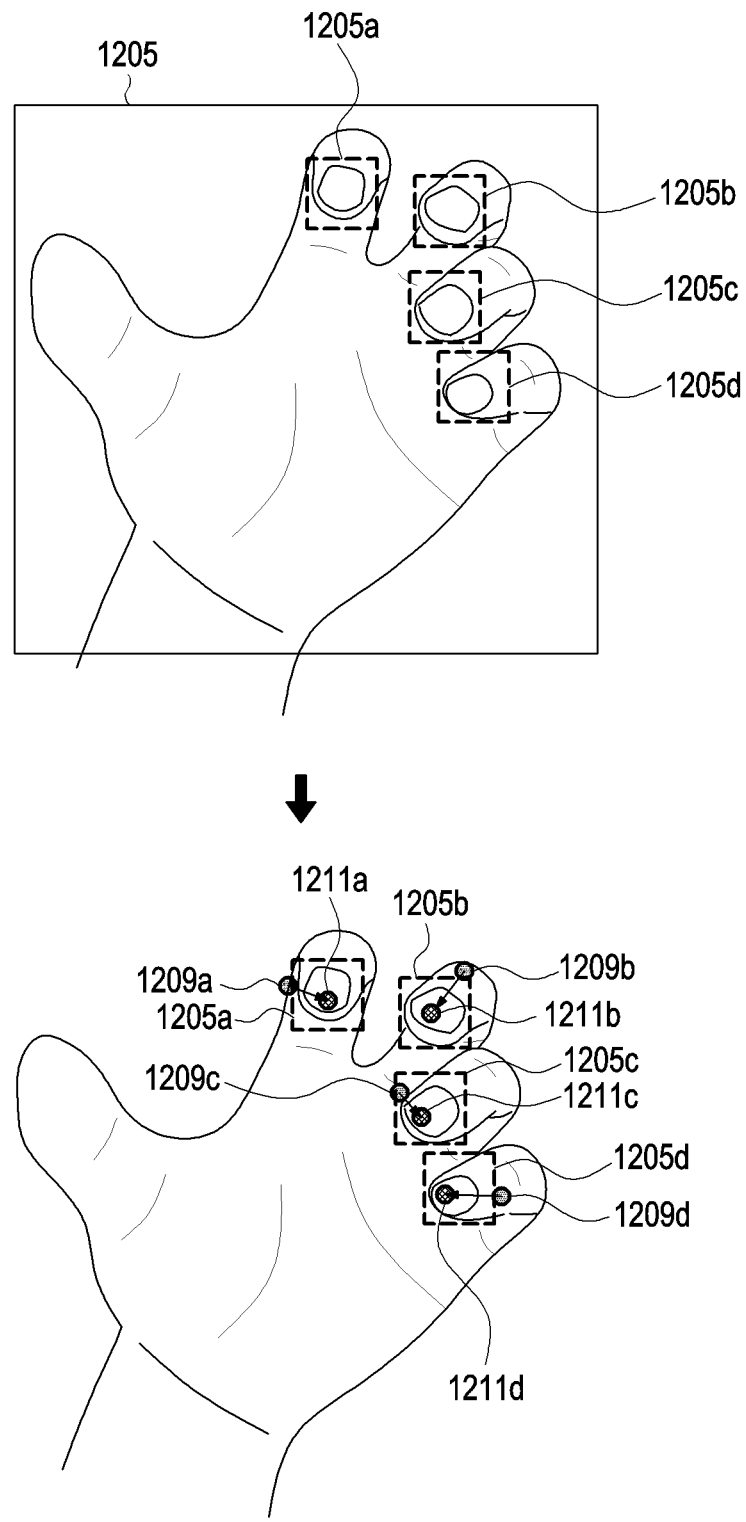
FIG. 12B is a view illustrating a method in which an electronic device corrects three-dimensional coordinate information about an object identified through a touch sensor using a camera according to an embodiment.
Figure 12C:
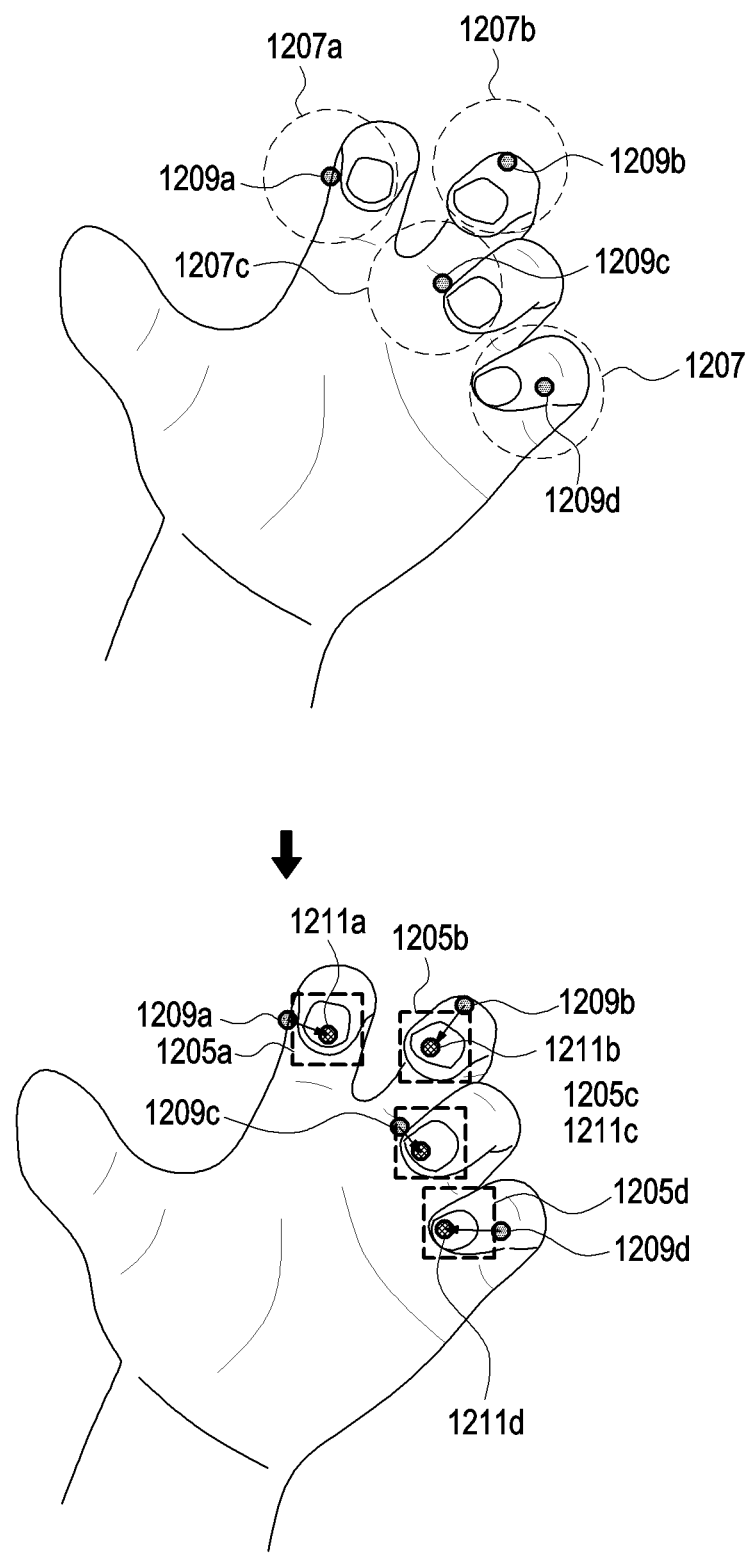
FIG. 12C is a view illustrating a method in which an electronic device corrects three-dimensional coordinate information about an object identified through a touch sensor using a camera according to an embodiment.

FIG. 11 is a flowchart 1100 illustrating a method in which an electronic device (e.g., the electronic device 101 of FIG. 1) corrects three-dimensional coordinate information about an object (e.g., the object 503 of FIG. 5B) identified through a touch sensor (e.g., the touch sensor 251 of FIG. 2) using a camera (e.g., the camera 314 of FIG. 3A) according to an embodiment. FIG. 12A is a view illustrating a method in which an electronic device 101 corrects three-dimensional coordinate information about an object identified through a touch sensor 251 using a camera 314 according to an embodiment. FIG. 12B is a view illustrating a method in which an electronic device 101 corrects three-dimensional coordinate information about an object identified through a touch sensor 251 using a camera 314 according to an embodiment. FIG. 12C is a view illustrating a method in which an electronic device 101 corrects three-dimensional coordinate information about an object identified through a touch sensor 251 using a camera 314 according to an embodiment. Hereinafter, operations of FIG. 11 are described with reference to FIGS. 12A to 12C.

According to an embodiment, in operation 1110, the electronic device 101 may identify first coordinate information on a first area (e.g., the first area 501a of FIG. 5B) and second coordinate information on a second area (e.g., the second area 501b of FIG. 5B) of at least one object using a touch sensor 251.

According to an embodiment, in operation 1130, the electronic device 101 may identify three-dimensional coordinate information about at least one object, based on the first coordinate information and the second coordinate information.

According to an embodiment, in operation 1150, the electronic device 101 may obtain position information about at least one object by using a camera.

Referring to FIG. 12A, the electronic device 101 may obtain position information about one point (e.g., fingertip) of each of at least one object 1201a, 1201b, 1201c, and 1201d (e.g., finger) positioned in one space 1203 (e.g., the space in the angle-of-view of the camera 314) using at least one camera (e.g., the camera 314) disposed in one area (e.g., the first area 501a and/or the second area 501b) of the touchscreen 501. For example, when the camera 314 is disposed in the first area 501a, the electronic device 101 may identify a position (e.g., a horizontal distance, a vertical distance, and/or a height distance) of the second area 501b for the at least one object 1201a, 1201b, 1201c, and 1201d. The electronic device 101 may identify a position (e.g., a horizontal distance, a vertical distance, and/or a height distance) of the first area 501a for at least one object 1201a, 1201b, 1201c, and 1201d using the camera 314.

According to an embodiment, the electronic device 101 may discover one point (e.g., fingertip) of each of the at least one object 1201a, 1201b, 1201c, and 1201d (e.g., finger) for a space formed by the first surface (e.g., the first surface 311 of FIG. 3A) (or the first area 501a) and the third surface (e.g., the third surface 321 of FIG. 3A) (or the second area 501b). For example, referring to FIG. 12B, the electronic device 101 may discover the areas 1205a, 1205b, 1205c, and 1205d in which one point (e.g., fingertip) of each of the at least one object 1201a, 1201b, 1201c, and 1201d (e.g., finger) is positioned for the area 1205 in the angle-of-view range of the camera 314 in the space formed by the first surface 311 (or the first area 501a) and the third surface 321 (or the second area 501b). As another example, referring to FIG. 12C, the electronic device 101 may identify the three-dimensional coordinate value of the at least one object 1201a, 1201b, 1201c, or 1201d identified through the touch sensor 251, and discover the areas 1205a, 1205b, 1205c, and 1205d where one point (e.g., fingertip) of each of the at least one object 1201a, 1201b, 1201c, and 1201d (e.g., finger) is positioned for the surrounding areas 1207a, 1207b, 1207c, and 1207d of the points 1209a, 1209b, 1209c, and 1209d corresponding to the identified three-dimensional coordinate value in the space formed by the first surface 311 (or first area 501a) and third surface 321 (or second area 501b).

According to an embodiment, the electronic device 101 may identify the position (e.g., the horizontal distance, the vertical distance, and/or the height distance) for the first area 501a and/or the second area 501b of one point (e.g., fingertip) of each of the at least one object 1201*a*. 1201*b*, 1201*c*, and 1201*d* (e.g., finger) in each area 1205*a*, 1205*b*, 1205*c*, or 1205*d*.

According to an embodiment, in a thirteenth operation 1170, the electronic device 101 may correct the identified three-dimensional coordinate information, based on the obtained position information. For example, the electronic device 101 may correct the three-dimensional coordinate value (e.g., the three-dimensional coordinate value corresponding to 1209*a*, 1209*b*, 1209*c*, and 1209*d*) of the at least one object 1201*a*, 1201*b*, 1201*c*, and 1201*d* identified through the touch sensor 251, based on position information (e.g., the coordinate value for the area 1205*a*, 1205*b*, 1205*c*, and 1205*d*) of one point (e.g., fingertip) of each of the at least one object 1201*a*, 1201*b*, 1201*c*, and 1201*d* identified using the camera 314. As an example, the electronic device 101 may identify the average of position information (e.g., the coordinate values for the areas 1205*a*, 1205*b*, 1205*c*, and 1205*d*) of each of the at least one object 1201*a*, 1201*b*, 1201*c*, and 1201*d* (e.g., a finger) identified using the camera 314 and three-dimensional coordinate information (e.g., the three-dimensional coordinate values corresponding to 1209*a*. 1209*b*, 1209*c*, and 1209*d*) of the at least one object 1201*a*. 1201*b*, 1201*c*, and 1201*d* identified through the touch sensor 251 as the three-dimensional coordinate information about the at least one object 1201*a*, 1201*b*, 1201*c*, and 1201*d*. As another example, the electronic device 101 may identify as the three-dimensional coordinate information about at least one object 1201*a*. 1201*b*, 1201*c*, and 1201*d* by applying a low weight (e.g., 0.3) to position information (e.g., coordinate values for the areas 1205*a*. 1205*b*, 1205*c*, and 1205*d*) about each of at least one object 1201*a*, 1201*b*, 1201*c*, and 1201*d* (e.g., finger) identified using the camera 314 and a high weight (e.g., 0.7) to the three-dimensional coordinate information (e.g., the three-dimensional coordinate values corresponding to 1209*a*, 1209*b*. 1209*c*, and 1209*d*) about the at least one object 1201*a*. 1201*b*, 1201*c*, and 1201*d* identified through the touch sensor 251. Referring to FIGS. 12B and 12C, according to the above-described correction result, the three-dimensional coordinate value corresponding to the position (e.g., 1209*a*. 1209*b*, 1209*c*, or 1209*d*) of at least one object 1201*a*. 1201*b*, 1201*c*, or 1201*d* identified through the touch sensor 251 may be corrected to the coordinate value corresponding to reference numeral 1211*a*. 1211*b*, 1211*c*, or 1211*d*.

According to an embodiment, the electronic device 101 may include a proximity sensor, an infrared sensor, and/or a ToF sensor in place of the camera 314, or may include the camera 314 and a proximity sensor, an infrared sensor, and/or a ToF sensor. The electronic device 101 may identify one point (e.g., fingertip) of each of the at least one object 1201*a*. 1201*b*, 1201*c*, or 1201*d* (e.g., finger) or an area 1205*a*, 1205*b*, 1205*c*, or 1205*d* in which each point (e.g., fingertip) is positioned, using a ToF sensor, and may perform the above-described operation of correcting coordinate values.

Figure 13A:
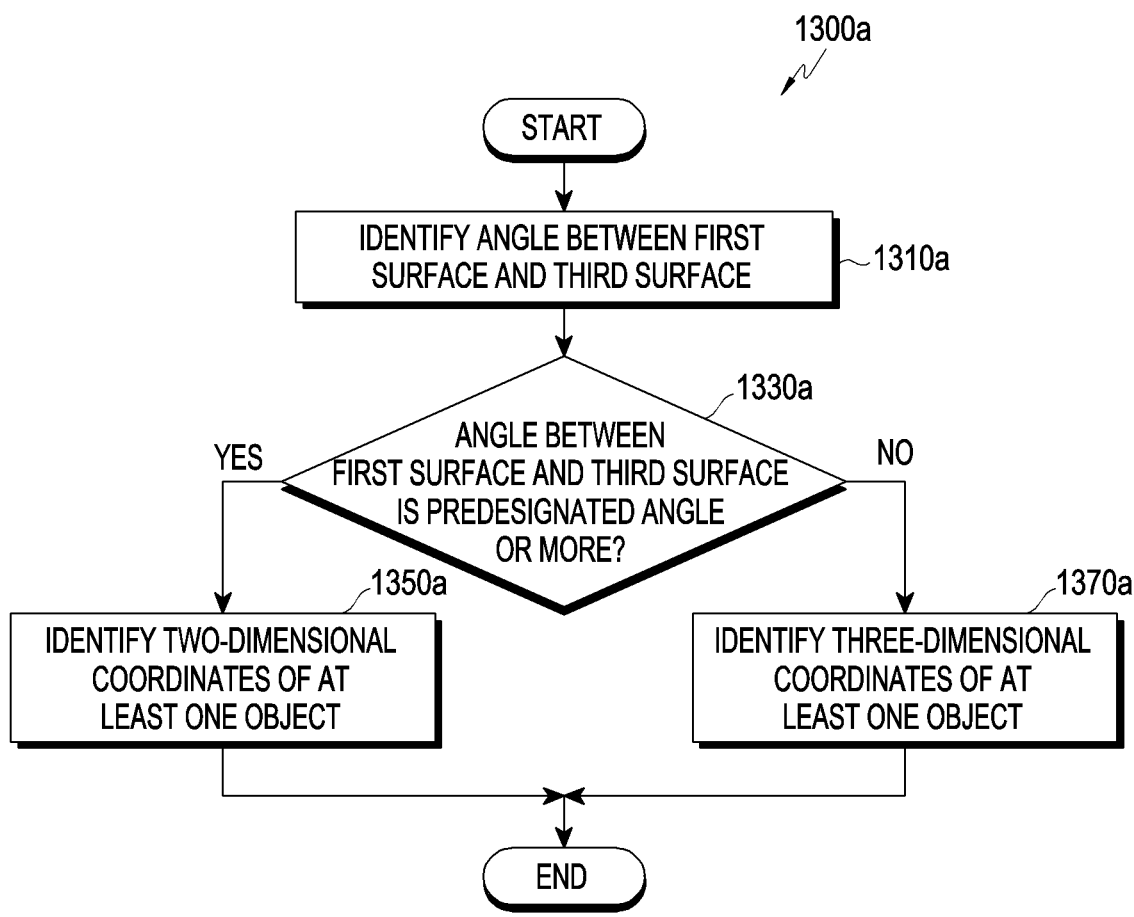
FIG. 13A is a flowchart illustrating a method for determining a coordinate measurement mode of an electronic device based on an angle between a first surface and a third surface according to an embodiment.

FIG. 13A is a flowchart 1300*a* illustrating a method for determining a coordinate measurement mode of an electronic device (e.g., the electronic device 101 of FIG. 1) based on an angle between a first surface (e.g., the first surface 311 of FIG. 3A) and a third surface (e.g., the third surface 321 of FIG. 3A) according to an embodiment.

According to an embodiment, in operation 1310*a*, the electronic device 101 may identify the angle between the first surface 311 and the third surface 321. For example, the electronic device 101 may identify the angle between the first surface 311 (or the first area 501*a* of FIG. 5B) and the third surface 321 (or the second area 501*b* of FIG. 5B) using at least one sensor (e.g., an angle sensor).

According to an embodiment, in operation 1330*a*, the electronic device 101 may identify whether the angle between the first surface 311 and the third surface 321 is greater than or equal to a predesignated angle. For example, the predesignated angle may be set to a value greater than 90 degrees. For example, the predesignated angle may be set to 120 degrees.

According to an embodiment, if it is identified that the angle between the first surface 311 and the third surface 321 is equal to or greater than the predesignated angle, the electronic device 101 may identify two-dimensional coordinates of at least one object in operation 1350*a*. For example, if it is identified that the angle between the first surface 311 and the third surface 321 is greater than or equal to the predesignated angle, the processor (e.g., the processor 120 of FIG. 1) may control the touch sensor IC (e.g., the touch sensor IC 253 of FIG. 2) to identify two-dimensional coordinates (e.g., first coordinate information or second coordinate information) of each of at least one object (e.g., the object 503 of FIG. 5B) on the touch screen (e.g., the touchscreen 501 of FIG. 5B). For example, the electronic device 101 may identify two-dimensional coordinates (e.g., first coordinate information or second coordinate information) of each of at least one object (e.g., the object 503) on the touchscreen 501 using the touch sensor (e.g., the touch sensor 251 of FIG. 2). According to an embodiment, the electronic device 101 may perform a designated operation (e.g., detecting a touch to the point corresponding to the two-dimensional coordinate of at least one of the object 503 and a gesture based on the two-dimensional coordinate of the at least one object 503 and controlling the electronic device 101 or an external electronic device (e.g., the electronic device 102 or the electronic device 104 of FIG. 1) based on the detected touch or gesture) based on the identified at least one two-dimensional coordinate.

According to an embodiment, if it is identified that the angle between the first surface 311 and the third surface 321 is less than the predesignated angle, the electronic device 101 may identify three-dimensional coordinates of at least one object in operation 1370*a*. For example, if it is identified that the angle between the first surface 311 and the third surface 321 is less than the predesignated angle, the processor (e.g., the processor 120 of FIG. 1) may control the touch sensor IC 253 to identify two-dimensional coordinates (e.g., first coordinate information or second coordinate information) of each of at least one object (e.g., the object 503) on the touch screen (e.g., the touchscreen 501 of FIG. 5B). For example, the electronic device 101 may identify first coordinate information and second coordinate information about each of the at least one object 503 using the touch sensor 251, and may identify three-dimensional coordinate information about each of the at least one object 503 based on the identified first coordinate information and second coordinate information. According to an embodiment, the electronic device 101 may perform a designated operation (e.g., detecting a gesture based on the three-dimensional coordinates of the at least one object 503 and/or controlling the electronic device 101 or the external electronic device (e.g., the electronic device 102 and the electronic device 104) based on the detected gesture), based on the identified at least one three-dimensional coordinate.

According to an embodiment, if the user input (e.g., menu selection and/or execution of a related application) for selecting a mode for identifying three-dimensional coordinates is received, the electronic device 101 may perform operation 1370a. According to an embodiment, the electronic device 101 may perform operation 1370a if it is identified that the angle between the first surface 311 and the third surface 321 is less than a predesignated angle after receiving a user input (e.g., menu selection and/or execution of a related application) for selecting the mode for identifying the three-dimensional coordinates or if a user input (e.g., menu selection and/or execution of a related application) for selecting the mode for identifying the three-dimensional coordinates is received after it is identified that the angle between the first surface 311 and the third surface 321 is less than the predesignated angle.

Figure 13B:
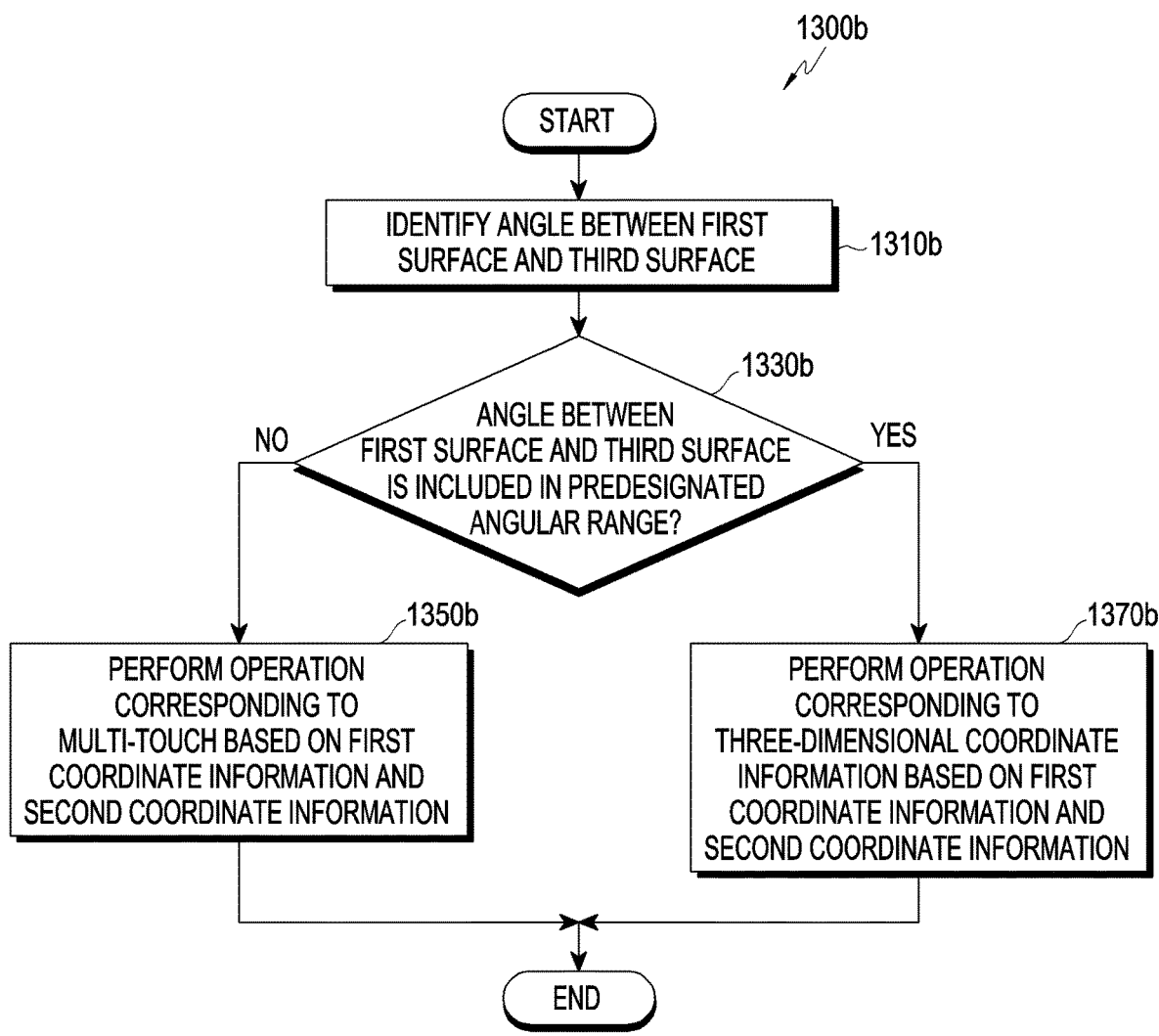
FIG. 13B is a flowchart illustrating a method in which an electronic device processes identified coordinate information based on an angle between a first surface and a third surface according to an embodiment.

FIG. 13B is a flowchart 1300b illustrating a method in which an electronic device (e.g., the electronic device 101 of FIG. 1) processes identified coordinate information based on an angle between a first surface (e.g., the first surface 311 of FIG. 3A) and a third surface (e.g., the third surface 321 of FIG. 3A) according to an embodiment.

According to an embodiment, in an eighteenth operation 1310b, the electronic device 101 may identify the angle between the first surface 311 and the third surface 321. For example, the electronic device 101 may identify the angle between the first surface 311 (or the first area 501a of FIG. 5B) and the third surface 321 (or the second area 501b of FIG. 5B) using at least one sensor (e.g., an angle sensor).

According to an embodiment, in a nineteenth operation 1330b, the electronic device 101 may identify whether the angle between the first surface 311 and the third surface 321 is included in a predesignated angular range. For example, the predesignated angular range may be set to an angular range about 90 degrees. For example, the predesignated angular range may be set to 70 degrees or more and 110 degrees or less. As another example, the predesignated angular range may be set to 0 degrees or more and less than 110 degrees.

According to an embodiment, if it is identified that the angle between the first surface 311 and the third surface 321 is not included in the predesignated angular range, in operation 1350b, the electronic device 101 may perform an operation corresponding to multi-touch, based on the first coordinate information and the second coordinate information. For example, when the angle between the first surface 311 and the third surface 321 is not included in the predesignated angular range, if coordinate values of an object (e.g., the object 503 of FIG. 5B) are identified through both the first area 501a and the second area 501b, the electronic device 101 may identify a first touch on the first area 501a and a second touch on the second area 501b, based on the identified coordinate values. The electronic device 101 may perform an operation corresponding to multi-touch, based on the first touch and the second touch. For example, the operation corresponding to multi-touch may include identifying a pinch zoom-in gesture or a pinch zoom-out gesture for the screen displayed on the touch screen (e.g., the touchscreen 501 of FIG. 5B) and/or controlling the screen display of the electronic device 101 or an external electronic device (e.g., the electronic device 102 or the electronic device 104 of FIG. 1) based on the identified gesture.

According to an embodiment, if it is identified that the angle between the first surface 311 and the third surface 321 is included in the predesignated angular range, in operation 1370b, the electronic device 101 may perform an operation corresponding to the three-dimensional coordinate information, based on the first coordinate information and the second coordinate information. For example, when the angle between the first surface 311 and the third surface 321 is included in a predesignated angular range, if coordinate values of the object 503 are identified through both the first area 501a and the second area 501b, the electronic device 101 may identify the three-dimensional coordinate information about the object 503 based on the identified coordinate values. The electronic device 101 may perform an operation corresponding to the identified three-dimensional coordinate information. For example, the operation corresponding to the three-dimensional coordinate information may include detecting a gesture based on the three-dimensional coordinate and/or controlling screen display of the electronic device 101 or an external electronic device (e.g., the electronic device 102 or the electronic device 104 of FIG. 1) based on the detected gesture.

Figure 14A:
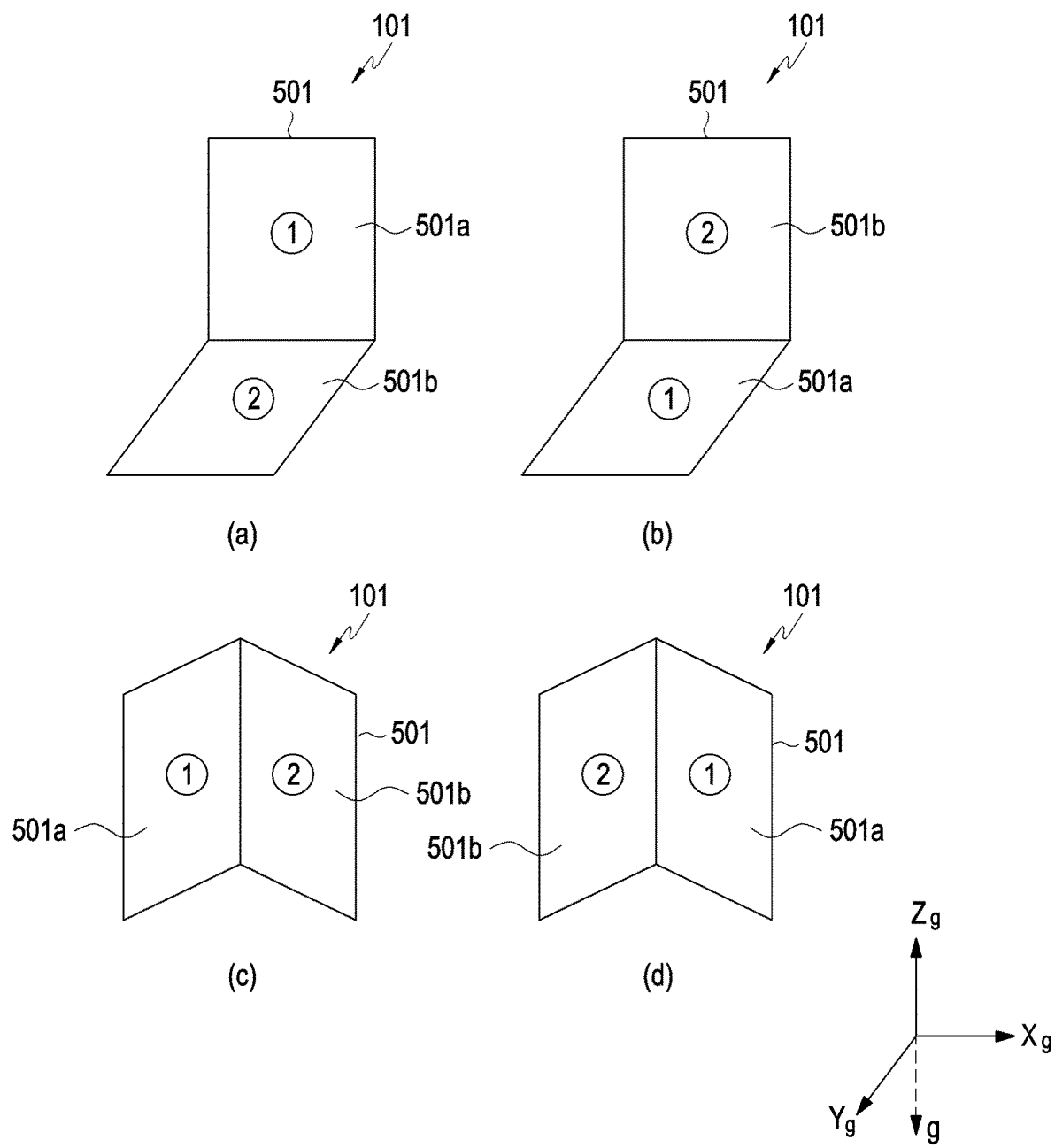
FIG. 14A is a view illustrating a method in which an electronic device corrects three-dimensional coordinate information based on the posture of the electronic device.
Figure 14B:
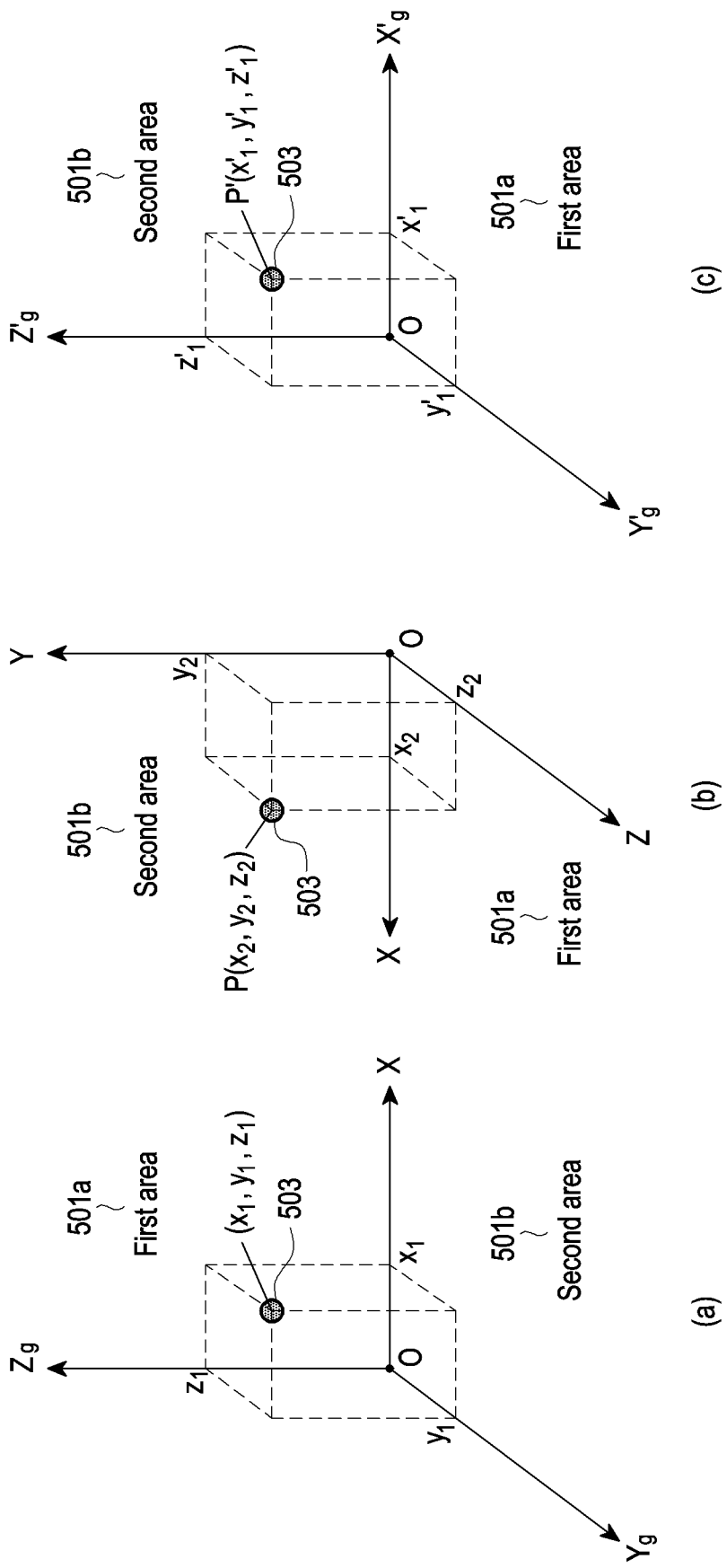
FIG. 14B is a view illustrating an electronic device corrects three-dimensional coordinate information when the electronic device is in a second posture.

FIG. 14A is a view illustrating a method in which an electronic device 101 corrects three-dimensional coordinate information based on a posture of the electronic device 101 (e.g., the display 330 of FIG. 3A). FIG. 14B is a view illustrating an electronic device 101 corrects three-dimensional coordinate information when the electronic device 101 (e.g., the display 330 of FIG. 3A) is in a second posture.

FIG. 14A illustrates various postures of the electronic device 101 that may be disposed with respect to the direction g of Earth's gravity. Hereinafter, it is assumed that the angle between the first area 501a and the second area 501b is 90 degrees.

For example, referring to FIG. 14A(a), the electronic device 101 may be disposed in a first posture in which the second area 501b is positioned on a plane (e.g., a coordinate plane formed by the $X_g$ axis and the $Y_g$ axis) perpendicular to the direction g of Earth's gravity and the first area 501a is positioned on a plane (e.g., a coordinate plane formed by the $Z_g$ axis and the $X_g$ axis) parallel to the direction g of Earth's gravity.

For example, referring to FIG. 14A(b), the electronic device 101 may be disposed in a second posture in which the first area 501a is positioned on a plane (e.g., a coordinate plane formed by the $X_g$ axis and the $Y_g$ axis) perpendicular to the direction g of Earth's gravity and the second area 501b is positioned on a plane (e.g., a coordinate plane formed by the $Z_g$ axis and the $X_g$ axis) parallel to the direction g of Earth's gravity.

For example, referring to FIG. 14A(c), the electronic device 101 may be disposed in a third posture in which the first area 501a and the second area 501b are positioned perpendicular to a plane (e.g., a coordinate plane formed by the $X_g$ axis and the $Y_g$ axis) perpendicular to the direction g of Earth's gravity, and the first area 501a and the second area 501b are positioned on the left side and right side, respectively.

For example, referring to FIG. 14A(c), the electronic device 101 may be disposed in a fourth posture in which the first area 501a and the second area 501b are positioned perpendicular to a plane (e.g., a coordinate plane formed by the $X_g$ axis and the $Y_g$ axis) perpendicular to the direction g of Earth's gravity, and the first area 501a and the second area 501b are positioned on the right side and left side, respectively.

According to an embodiment, the electronic device 101 may be disposed in the above-described postures and other various postures, and even if objects are positioned at the same coordinates on a coordinate system (e.g., a coordinate system represented by the $X_g$ axis, the Ye axis, and the $Z_g$ axis) with respect to the direction g of Earth's gravity, three-dimensional coordinate information (e.g., three-dimensional coordinate value) of the object (e.g., the object 503 in FIG. 5B) identified by the electronic device 101 using a touch sensor (e.g., the touch sensor 251 in FIG. 2) may be identified as different depending on the posture in which the electronic device 101 is disposed. According to an embodiment, the electronic device 101 may identify the posture of the electronic device 101 with respect to the direction g of Earth's gravity using at least one posture sensor (e.g., the sensor module 176 of FIG. 1) (e.g., an acceleration sensor, a gyro sensor, and/or a gravity sensor), and may correct three-dimensional coordinate information (e.g., three-dimensional coordinate value) about the object 503 according to the identified posture.

FIG. 14B illustrates a method for correcting three-dimensional coordinate information (e.g., three-dimensional coordinate value) about the object 503 when the electronic device 101 is disposed in the second posture (e.g., the posture of FIG. 14A(b)).

Referring to FIG. 14B(a), the object 503 on a spatial coordinate system with respect to the direction g of Earth's gravity is illustrated. Here, the origin O may indicate the position of the left end of the folding axis (e.g., A-A' in FIG. 3A). The object 503 may be positioned at the point $[x_1, y_1, z_1]$ on the spatial coordinate system with respect to the direction g of Earth's gravity.

If the electronic device 101 is disposed in the first posture (e.g., the posture of FIG. 14A(a)), because the spatial coordinate system with respect to the third surface (e.g., the third surface 321 of FIG. 3A) (or the second area 501b) of the electronic device 101 matches the spatial coordinate system with respect to the direction g of Earth's gravity, the three-dimensional coordinate information (e.g., the three-dimensional coordinate value) about the object 503 identified by the electronic device 101 using the touch sensor 251 may be identified as $[x_1, y_1, z_1]$.

Referring to (b) and (c) of FIG. 14B, if the electronic device 101 is disposed in the second posture (e.g., the posture of FIG. 14A(b)), the three-dimensional coordinate information (e.g., the three-dimensional coordinate value) of the object 503 identified by the electronic device 101 using the touch sensor 251 may be identified as $[x_2, y_2, z_2]$. Compared with FIG. 14B(a), the spatial coordinate system (e.g., the coordinate system represented by the X-axis, the Y-axis, and the Z-axis) with respect to the third surface (e.g., the third surface 321 of FIG. 3A) (or the second area 501b) of the electronic device 101 may be different from the coordinate system (e.g., the coordinate system represented by the $X_g$-axis, the $Y_g$-axis, and the $Z_g$-axis) with respect to the direction g of Earth's gravity. More specifically, the X axis may be opposite to the $X_g$ axis, the Z axis may correspond to the $Y_g$ axis, and the Y axis may correspond to the $Z_g$ axis. Further, $x_2$ may be a value (e.g., $L-x_1$) obtained by subtracting $x_1$ from the horizontal length L of the second area 501b, $y_2$ may be the same as $z_1$, and $z_2$ may be the same as $y_1$. According to an embodiment, if it is identified that the posture of the electronic device 101 is the second posture, the electronic device 101 may correct the identified three-dimensional coordinate value (e.g., $[x_2, y_2, z_2]$) to $[L-x_2, z_2, y_2]$. According to an embodiment, the electronic device 101 may identify that the corrected three-dimensional coordinate value $[L-x_2, z_2, y_2]$ is the three-dimensional coordinate value (e.g., $[x_1', y_1', z_1']$) of the object 503 on the spatial coordinate system (e.g., the coordinate system represented by the axis $X_g'$, the axis $Y_g'$, and the axis $Z_g'$) with respect to the direction g of Earth's gravity.

In the above-described paragraphs, a method for correcting three-dimensional coordinate information has been described under the assumption that the electronic device 101 is in the second posture. However, the electronic device 101 may be disposed in the above-described second posture and various other postures. The measurement value P of three-dimensional coordinate information represented on the spatial coordinate system (e.g., the coordinate system represented by the X axis, the Y axis, and the Z axis) with respect to the third surface (e.g., the third surface 321 of FIG. 3A)(or the second area 501b) may be corrected (e.g., coordinate rotation) into the three-dimensional coordinate value P' represented on the coordinate system (e.g., the coordinate system represented by the $X_g'$ axis, the $Y_g'$ axis, and the $Z_g'$ axis) with respect to the direction g of Earth's gravity.

According to an embodiment, the electronic device 101 may identify the posture of the electronic device 101 with respect to Earth's gravity direction g using at least one posture sensor (e.g., the sensor module 176 of FIG. 1)(e.g., an acceleration sensor, a gyro sensor, and/or a gravity sensor), convert the spatial coordinate system (e.g., the coordinate system represented by the X axis, Y axis, and Z axis) with respect to the third surface (e.g., the third surface 321 of FIG. 3A (or the second area 501b)) of the electronic device 101 into the coordinate system (e.g., the coordinate system represented by the $X_g$ axis, $Y_g$ axis, and $Z_g$ axis) with respect to Earth's gravity direction g and then identify the three-dimensional coordinate value (e.g., $[x_1, y_1, z_1]$) of the object 503.

Figure 15:
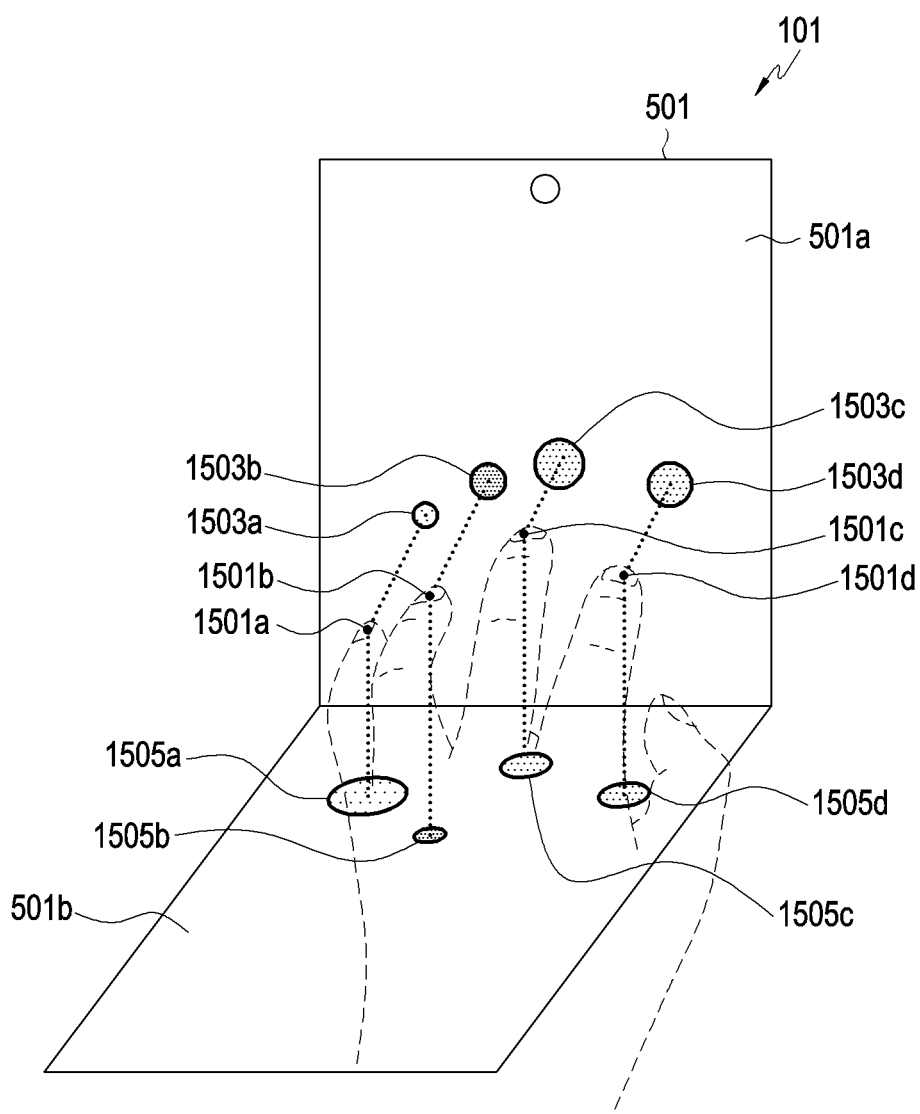
FIG. 15 is a view illustrating a method in which an electronic device controls a screen displaying identified three-dimensional coordinate information on a touchscreen according to an embodiment.

FIG. 15 is a view illustrating a method in which an electronic device 101 controls a screen displaying identified three-dimensional coordinate information on a touchscreen 501 according to an embodiment.

According to an embodiment, the electronic device 101 may identify three-dimensional coordinate information about each of the plurality of objects 1501a. 1501b, 1501c, and 1501d using a touch sensor (e.g., the touch sensor 251 of FIG. 2). Referring to FIG. 15, a plurality of objects 1501a, 1501b, 1501c, and 1501d may represent a point (e.g., a fingertip) of the user's finger.

According to an embodiment, the electronic device 101 may visualize three-dimensional coordinate information about each of the plurality of identified objects 1501a. 1501b, 1501c, and 1501d, and may display the same on the first area 501a and/or the second area 501b.

Referring to FIG. 15, the electronic device 101 may identify the point corresponding to the position of each of the plurality of objects 1501a, 1501b, 1501c, and 1501d for the first area 501a For example, the electronic device 101 may identify the point corresponding to the position of each object for the first area 501a (e.g., an orthogonal projection coordinate value of the three-dimensional coordinate value of each object for the first area 501a), based on the three-dimensional coordinate value of each of the plurality of objects 1501a, 1501b, 1501c, and 1501d. As another example, the electronic device 101 may identify the point corresponding to the position of each object for the first area 501a, based on the first coordinate information about each of the plurality of objects 1501a, 1501b, 1501c, and 1501d. According to an embodiment, the electronic device 101 may display the first graphic objects 1503a. 1503b, 1503c, and 1503d at the identified points. According to an embodiment, the electronic device 101 may identify the point corresponding to the position of each of the plurality of objects 1501a, 1501b, 1501c, and 1501d for the second area 501b. For example, the electronic device 101 may identify the point corresponding to the position of each object for the second area 501b (e.g., an orthogonal projection coordinate value of the three-dimensional coordinate value of each object for the second area 501b), based on the three-dimensional coordinate value of each of the plurality of objects 1501a, 1501b, 1501c, and 1501d. As another example, the electronic device 101 may identify the point corresponding to the position of each object for the second area 501b, based on the second coordinate information about each of the plurality of objects 1501a, 1501b, 1501c, and 1501d. According to an embodiment, the electronic device 101 may display the second graphic objects 1505a, 1505b, 1505c, and 1505d at the identified points.

According to an embodiment, the electronic device 101 may display only one of the first graphic objects 1503a, 1503b, 1503c, and 1503d or the second graphic objects 1505a, 1505b, 1505c, and 1505d in the first area 501a or the second area 501b, or may display all of the first graphic objects 1503a, 1503b, 1503c, and 1503d and the second graphic objects 1505a, 1505b, 1505c, and 1505d as illustrated in FIG. 15.

According to an embodiment, graphic objects (e.g., the first graphic objects 1503a, 1503b, 1503c, and 1503d and/or the second graphic objects 1505a, 1505b, 1505c, and 1505d) displayed in the first area 501a and/or the second area 501b may be displayed differently depending on the height (e.g., vertical distance) from each area (e.g., the first area 501a and/or the second area 501b). For example, the first graphic objects 1503a. 1503b, 1503c, and 1503d may be displayed smaller as they are farther away from the first area 501a, and may be displayed larger as they are closer to the first area 501a. For example, the second graphic objects 1505a, 1505b, 1505c, and 1505d may be displayed smaller as they are farther away from the second area 501b, and may be displayed larger as they are closer to the second area 501b.

According to an embodiment, the electronic device 101 may display an execution screen of an application in the first area 501a and/or the second area 501b. For example, the electronic device 101 may display the execution screen of the application only in the first area 501a, and may display an empty screen (e.g., a black screen) in the second area 501b. As another example, the electronic device 101 may display the execution screen of the application in the first area 501a and the second area 501b. According to an embodiment, if the user moves one or more fingers in the space formed by the first area 501a and the second area 501b while the application execution screen is displayed, the electronic device 101 may identify three-dimensional coordinate information about each finger and may display the above-described graphic objects (e.g., the first graphic objects 1503a, 1503b. 1503c, and 1503d and/or the second graphic objects 1505a, 1505b. 1505c, and 1505d) at the point corresponding to each finger for the first area 501a and/or the second area 501b. Further, the electronic device 101 may identify three-dimensional coordinate information about each finger, detect the position and/or movement of each of the one or more fingers, and identify the user's gesture using the one or more fingers. The electronic device 101 may control the screen being displayed (e.g., an execution screen of an application) based on the identified gesture. For example, the electronic device 101 may control the display of the screen (e.g., the execution screen of the application) by recognizing the identified gesture as an input to the screen (e.g., the execution screen of the application) being displayed, and/or may select an icon and/or a menu displayed on the screen (e.g., the execution screen of the application). For example, if the execution screen of the game application is being displayed in the first area 501a and/or the second area 501b, the electronic device 101 may control the execution screen of the game application based on the identified gesture.

Figure 16:
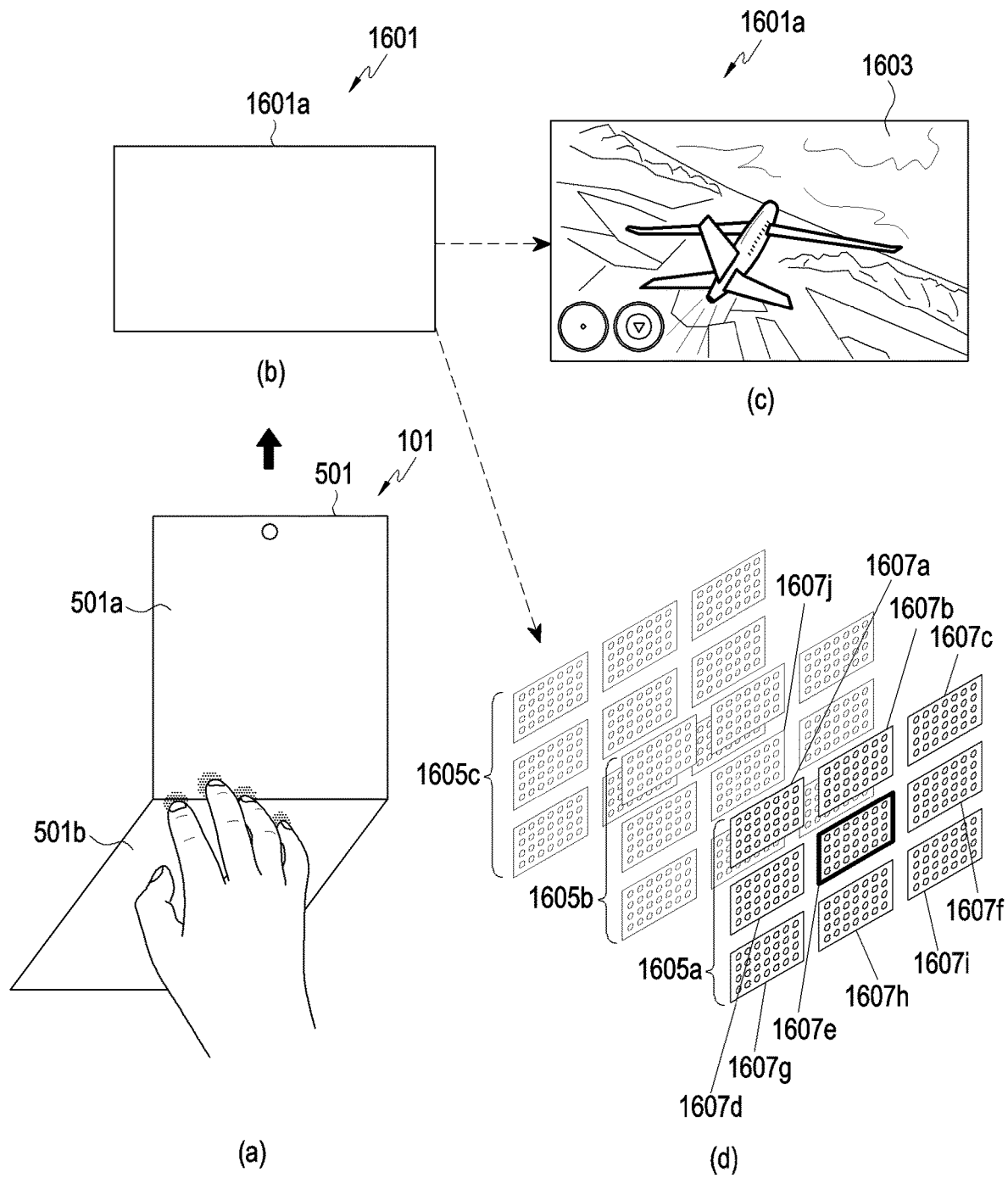
FIG. 16 is a view illustrating a method in which an electronic device controls an external electronic device based on identified three-dimensional coordinate information according to an embodiment.

FIG. 16 is a view illustrating a method in which an electronic device 101 controls an external electronic device 1601 (e.g., the electronic device 102 or the electronic device 104 of FIG. 1) based on identified three-dimensional coordinate information according to an embodiment.

According to an embodiment, the electronic device 101 may be wiredly and/or wirelessly connected to at least one external electronic device (e.g., the external electronic device 1601). For example, the external electronic device 1601 may be an electronic device including an external display 1601a, and may include, e.g., a television (TV).

Referring to FIG. 16(a), if one or more fingers (or hands) of the user are positioned in a space formed by the first area 501a and the second area 501b, the electronic device 101 may identify three-dimensional coordinate information about one point (e.g., fingertip) (e.g., 1601a, 1601b. 1601c, or 1601d) of each finger using a touch sensor (e.g., the touch sensor 251 of FIG. 2). According to an embodiment, the electronic device 101 may control the external electronic device 1601 based on the identified three-dimensional coordinate information about each finger. For example, the electronic device 101 may identify the user's gesture using one or more fingers, based on the three-dimensional coordinate information about each finger, and may control the screen displayed on the display 1601a of the external electronic device 1601, based on the identified gesture. For example, the electronic device 101 may be referred to as a three-dimensional controller for controlling the external electronic device 1601, or may be described as operating as a three-dimensional controller for controlling the external electronic device 1601.

Referring to FIG. 16(b), various execution screens may be displayed on the external display 1601a of the external electronic device 1601.

For example, as illustrated in FIG. 16(c), an execution screen 1603 of a game application (e.g., an application providing 3D graphics) may be displayed on the display 1601a of the external electronic device 1601. The electronic device 101 may control the game application and/or the execution screen 1603 by identifying the user's gesture in the space formed by the first area 501a and the second area 501b.

As another example, as illustrated in FIG. 16(d), the electronic device 101 may three-dimensionally control the screen displayed on the external electronic device 1601. For example, the external electronic device 1601 may include menus 1605a. 1605b, and 1605c (in other words, a 3D menu) having a depth and display a menu screen corresponding to any one menu among the menus on the external display 1601a. According to an embodiment, e.g., if it is identified that the user's finger moves in one direction (e.g., the $+Y_g$ direction or the $-Y_g$ direction of FIG. 14B) on the spatial coordinate system with respect to Earth's gravity direction g, the electronic device 101 may perform navigation between the first layer screen 1605a, the second layer screen 1605b, and the third layer screen 1605c. For example, if it is identified that the user's finger moves in the $+Y_g$ direction, the electronic device 101 may switch the menu screens displayed in the order of the third layer screen 1605c, the second layer screen 1605b, and the first layer screen 1605a according to the moving distance, and if it is identified that the user's finger moves in the $-Y_g$ direction, the electronic device 101 may switch the screens displayed in the order of the first layer screen 1605a, the second layer screen 1605b, and the third layer screen 1605c according to the moving distance. According to an embodiment, each layer screen may include a plurality of menu screens 1607

(e.g., 1607a, 1607b, 1607c, 1607d, 1607e, 1607f, 1607g, 1607h, and 1607i) in the horizontal direction and/or the vertical direction, and if it is identified that the user's finger moves in one direction (e.g., the $+X_g$ direction or the $-X_g$ direction and/or the $+Z_g$ direction or the $-Z_g$ direction in FIG. 14B) on the spatial coordinate system with respect to Earth gravity direction g, the electronic device 101 may perform navigation between the menu screens. For example, if it is identified that the user's finger moves in the $+X_g$ direction while the menu screen 1607e is displayed, the electronic device 101 may display the menu screen 1607f. For example, if it is identified that the user's finger moves in the $+Z_g$ direction while the menu screen 1607e is displayed, the electronic device 101 may display the menu screen 1607b. According to an embodiment, as described above, if it is identified that the user's finger moves in the $+Y_g$ direction while the menu screen 1607e is displayed, the electronic device 101 may display the tenth menu screen 1607j included in the second layer screen 1605b.

According to an embodiment, if the multimedia content (e.g., a video) is being played on the external electronic device 1601, the electronic device 101 may adjust the volume or brightness of the multimedia content being played on the external electronic device 1601 and/or may move the playback time forward or backward, based on the user's gesture on the space formed by the first area 501a and the second area 501b. For example, if it is identified that the user's finger moves in the $+X_g$ direction or the $-X_g$ direction, the electronic device 101 may move the playback time of the multimedia content being played backward or forward. For example, if it is identified that the user's finger moves in the $+Z_g$ direction or the $-Z_g$ direction, the electronic device 101 may increase or decrease the volume of the multimedia content being played. For example, if it is identified that the user's finger moves in the $+Y_g$ direction or the $-Y_g$ direction, the electronic device 101 may increase or decrease the brightness of the multimedia content being played. As another example, if it is identified that the user's finger moves in the $+Y_g$ direction or the $-Y_g$ direction from one point in the $-X_g$ direction, the electronic device 101 may increase or decrease the volume of multimedia content being played, and if it is identified that the user's finger moves in the $+Y_g$ direction or the $-Y_g$ direction from one point in the $+X_g$ direction, the electronic device 101 may increase or decrease the brightness of multimedia content being played.

Figure 17:
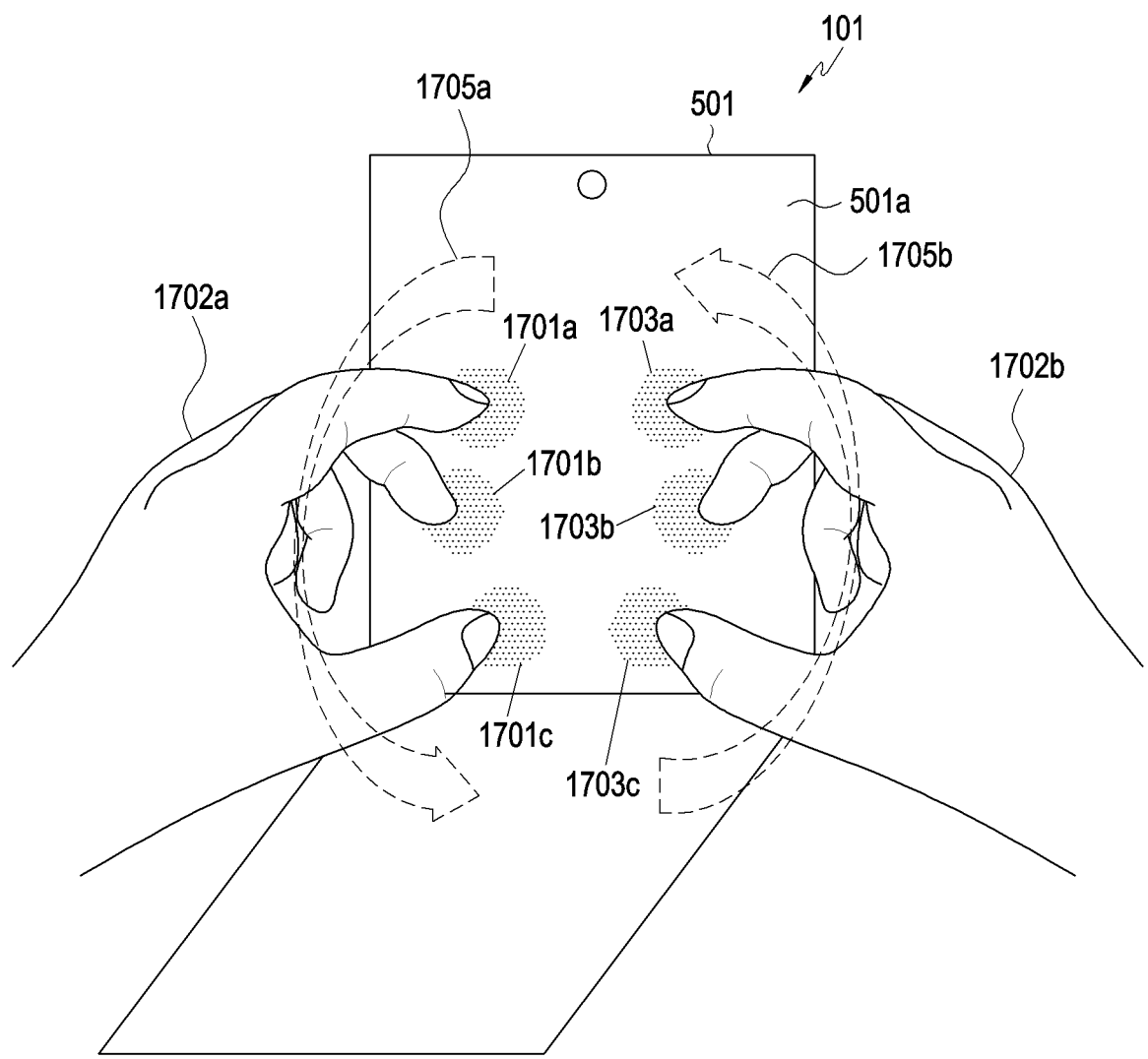
FIG. 17 illustrates an example designated operation performed by an electronic device detecting a user's gesture in a space formed by a first area and a second area using a touchscreen according to an embodiment.

FIG. 17 illustrates an example designated operation performed by an electronic device 101 detecting a user's gesture in a space formed by a first area 501a and a second area 501b using a touchscreen 501 according to an embodiment.

According to an embodiment, the electronic device 101 may detect the user's gesture in a space formed by the first area 501a and/or the second area 501b in a state in which a three-dimensional object is displayed on the first area 501a and/or the second area 501b or on a display (e.g., the display 1601a of FIG. 16) of an external electronic device (e.g., the external electronic device 1601 of FIG. 16). For example, if the user rotates the left hand 1702a in the first direction 1705a and the right hand 1702b in the second direction 1705b in the space, the electronic device 101 may identify three-dimensional coordinate information about fingers (or fingertips)(e.g., 1701a. 1701b, 1701c, 1703a, 1703b, and 1703c) of each hand (e.g., the left hand 1702a or the right hand 1702b) using a touch sensor (e.g., the touch sensor 251 of FIG. 2). The electronic device 101 may identify gestures using both hands of the user by identifying three-dimensional coordinate information about fingers (or fingertips) (e.g., 1701a. 1701b, 1701c, 1703a, 1703b, and 1703c). According to an embodiment, the electronic device 101 may identify three-dimensional coordinate information about fingers (or fingertips) (e.g., 1701a, 1701b, 1701c, 1703a. 1703b, and 1703c) to distinguish the user's left hand and right hand, and may identify three-dimensional coordinate information about each finger according to the corresponding hand. According to an embodiment, the electronic device 101 may identify the identified user's gesture (e.g., a gesture of rotating the left hand 1702a in the first direction 1705a and rotating the right hand 1702b in the second direction 1705b), and may perform a designated operation corresponding to the identified gesture. For example, the electronic device 101 may rotate and/or move the three-dimensional object displayed on the first area 501a and/or the second area 501b or the external display 1601a of the external electronic device 1601 to correspond to the first direction 1705a and/or the second direction 1705b.

According to an embodiment, an electronic device may include a hinge structure; a first housing connected to the hinge structure and including a first surface facing in a first direction and a second surface facing in a second direction opposite to the first direction; a second housing connected to the hinge structure and including a third surface facing in a third direction and a fourth surface facing in a fourth direction opposite to the third direction, wherein in a folded state, the first surface faces the third surface and, in an unfolded state, the first surface forms a substantially coplanar plane with the third surface; a flexible display including a first area exposed through at least a portion of the first surface of the first housing and a second area exposed through at least a portion of the third surface of the second housing; a touch sensor disposed at a position corresponding to at least a partial area of the flexible display; memory; and a processor. The memory may store instructions configured to cause, when executed by the processor, the electronic device to, identify first coordinate information of at least one object on the first area and second coordinate information of at least one object on the second area, using the touch sensor and identify three-dimensional coordinate information of at least one object on a space formed by the first surface and the third surface based on the identified first coordinate information and the identified second coordinate information.

According to an embodiment, the memory may store instructions configured to cause, when executed by the processor, the electronic device to, change a coordinate value measured with respect to the first surface into a coordinate value on a predesignated coordinate system based on a predesignated angle and identify the three-dimensional coordinate information based on the changed coordinate value and the second coordinate information.

According to an embodiment, the electronic device may further include at least one angle sensor. The memory may store instructions configured to cause, when executed by the processor, the electronic device to, identify an angle between the first surface and the third surface using the at least one angle sensor, change a coordinate value of the first coordinate information into a coordinate value on a predesignated coordinate system based on the identified angle, and identify the three-dimensional coordinate information based on the changed coordinate value and the second coordinate information.

According to an embodiment, the memory may store instructions configured to cause, when executed by the processor, the electronic device to, identify a difference between the angle between the first surface and the third surface and a predesignated angle and change the first coordinate information into the coordinate value based on the identified difference.

According to an embodiment, the memory may store instructions configured to cause, when executed by the processor, the electronic device to, apply a weight to at least one of the first coordinate information or the second coordinate information and identify the three-dimensional coordinate information based on applying the weight to the at least one of the first coordinate information or the second coordinate information.

According to an embodiment, the first coordinate information may include a first coordinate on a first axis and a second coordinate on a second axis. The second coordinate information may include a third coordinate on the first axis and a fourth coordinate on a third axis. The third coordinate may be related to the first coordinate. The memory may store instructions configured to cause, when executed by the processor, the electronic device to, identify the three-dimensional coordinate information, based on at least one of the first coordinate or the third coordinate, and based on the second coordinate and the fourth coordinate.

According to an embodiment, the first coordinate information may include a first coordinate on a first axis, a second coordinate on a second axis, and a third coordinate on a third axis. The second coordinate information may include a fourth coordinate on the first axis, a fifth coordinate on the second axis, and a sixth coordinate on the third axis. The fourth coordinate may be related to the first coordinate.

According to an embodiment, the electronic device may further include at least one of a camera or a time-of-flight (ToF) sensor. The memory may store instructions configured to cause, when executed by the processor, the electronic device to, obtain position information about the at least one object from at least one of the camera or the ToF sensor and correct at least one of the first coordinate information, the second coordinate information, or the three-dimensional coordinate information based on the obtained position information.

According to an embodiment, at least one of the camera or the ToF sensor may be disposed to be exposed to an outside through at least one of the first surface or the third surface or may be disposed under at least one of the first area or the second area.

According to an embodiment, the memory may store instructions configured to cause, when executed by the processor, the electronic device to, identify a position of the at least one object for an area related to the identified three-dimensional coordinate information using at least one of the camera or the ToF sensor.

According to an embodiment, the memory may store instructions configured to cause, when executed by the processor, the electronic device to, identify two-dimensional coordinate information of the at least one object on the first area or the second area based on the first coordinate information or the second coordinate information based on an angle between the first surface and the third surface being a predesignated angle or more. The at least one processor may be configured to identify the three-dimensional coordinate information based on the angle between the first surface and the third surface being the predesignated angle or less.

According to an embodiment, the electronic device may further include at least one sensor, wherein the at least one sensor comprises at least one of an acceleration sensor, a gyro sensor, or a gravity sensor. The memory may store instructions configured to cause, when executed by the processor, the electronic device to, identify a posture of the electronic device using the at least one sensor and determine the identified three-dimensional coordinate information based on the identified posture.

According to an embodiment, the memory may store instructions configured to cause, when executed by the processor, the electronic device to, display a position of the at least one object in at least one of the first area or the second area based on at least one of the first coordinate information, the second coordinate information, or the identified three-dimensional coordinate information.

According to an embodiment, the memory may store instructions configured to cause, when executed by the processor, the electronic device to, display a different position of the at least one object according to a distance from at least one of the first area or the second area to the at least one object.

According to an embodiment, the memory may store instructions configured to cause, when executed by the processor, the electronic device to, identify at least one of a position or movement of each of the at least one object based on the identified three-dimensional coordinate information, identify a user gesture based on at least one of the identified at least one of the position or movement of the at least one object, and control an external electronic device to perform a designated operation corresponding to the identified gesture.

According to an embodiment, a method for controlling an electronic device may include identifying first coordinate information about at least one object on a first area of a flexible display and second coordinate information about the at least one object on a second area of the flexible display using a touch sensor of the electronic device, the first area being exposed through at least a portion of a first surface of the electronic device, and the second area being exposed through at least a portion of a third surface of the electronic device, the first surface facing the third surface in a folded state and, in an unfolded state, the first surface forming substantially a coplanar plane with the third surface; and identifying three-dimensional coordinate information about the at least one object on a space formed by the first surface and the third surface.

According to an embodiment, identifying the three-dimensional coordinate information about the at least one object based on the identified first coordinate information and the identified second coordinate information may include changing a coordinate value measured with respect to the first surface into a coordinate value on a predesignated coordinate system based on a predesignated angle or an angle between the first surface and the third surface; and identifying three-dimensional coordinate information based on the changed coordinate value and the second coordinate information.

According to an embodiment, identifying the three-dimensional coordinate information about the at least one object based on the identified first coordinate information and the identified second coordinate information may include applying a weight to at least one of the first coordinate information or the second coordinate information; and identifying the three-dimensional coordinate information based on applying the weight to the at least one of the first coordinate information or the second coordinate information.

According to an embodiment, the method for controlling the electronic device may further include obtaining position information about the at least one object from at least one of a camera of the electronic device or a ToF sensor of the electronic device; and correcting at least one of the first coordinate information, the second coordinate information, or the three-dimensional coordinate information based on the obtained position information.

According to an embodiment, an electronic device may include a hinge structure; a first housing connected to the hinge structure and including a first surface facing in a first direction and a second surface facing in a second direction opposite to the first direction; a second housing connected to the hinge structure and including a third surface facing in a third direction and a fourth surface facing in a fourth direction opposite to the third direction, wherein in a folded state, the first surface faces the third surface and, in an unfolded state, the first surface forms a substantially coplanar plane with the third surface, a flexible display including a first area exposed through at least a portion of the first surface of the first housing and a second area exposed through at least a portion of the third surface of the second housing; a touch sensor disposed at a position corresponding to at least a partial area of the flexible display; memory; and a processor. The memory may store instructions configured to cause, when executed by the processor, the electronic device to, identify first coordinate information of at least one object on the first area and second coordinate information of at least one object on the second area, using the touch sensor, perform an operation corresponding to three-dimensional coordinate information of at least one object on a space formed by the first surface and the third surface based on the identified first coordinate information and the identified second coordinate information, based on an angle between the first surface and the third surface being included in a predesignated angular range, and perform an operation corresponding to a multi-touch based on the identified first coordinate information and the identified second coordinate information based on the angle between the first surface and the third surface being not included in the predesignated angular range.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A. B. or C." may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic." "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
 a first housing comprising a first surface facing in a first direction and a second surface facing in a second direction opposite to the first direction;

a second housing comprising a third surface facing in a third direction and a fourth surface facing in a fourth direction opposite to the third direction;

a hinge structure foldably connecting the first housing and the second housing, wherein in a folded state of the electronic device, the first surface faces the third surface and, in an unfolded state of the electronic device, the first surface and the third surface form a substantially coplanar plane;

a flexible display comprising a first area exposed through at least a portion of the first surface of the first housing and a second area exposed through at least a portion of the third surface of the second housing;

a touch sensor provided at a position corresponding to at least a partial area of the flexible display;

memory; and a processor, wherein the memory stores instructions configured to cause, when executed by the processor, the electronic device to:

identify, using the touch sensor, first coordinate information of at least one object on the first area and second coordinate information of the at least one object on the second area; and identify, based on the first coordinate information and the second coordinate information, three-dimensional coordinate information of the at least one object on a space formed by the first surface and the third surface.

2. The electronic device of claim 1, wherein the memory stores instructions configured to cause, when executed by the processor, the electronic device to:

change a coordinate value measured with respect to the first surface into a coordinate value on a predesignated coordinate system based on a predesignated angle; and identify the three-dimensional coordinate information based on the changed coordinate value and the second coordinate information.

3. The electronic device of claim 1, further comprising at least one angle sensor, wherein the memory stores instructions configured to cause, when executed by the processor, the electronic device to: identify, using the at least one angle sensor, an angle between the first surface and the third surface;

change a coordinate value of the first coordinate information into a coordinate value on a predesignated coordinate system based on the identified angle; and identify the three-dimensional coordinate information based on the changed coordinate value and the second coordinate information.

4. The electronic device of claim 3, wherein the memory stores instructions configured to cause, when executed by the processor, the electronic device to:

identify a difference between the angle between the first surface and the third surface and a predesignated angle; and change the coordinate value of the first coordinate information into the coordinate value on a predesignated coordinate system based on the identified difference.

5. The electronic device of claim 1, wherein the memory stores instructions configured to cause, when executed by the processor, the electronic device to:

apply a weight to at least one of the first coordinate information or the second coordinate information; and identify the three-dimensional coordinate information based on applying the weight to the at least one of the first coordinate information or the second coordinate information.

6. The electronic device of claim 1, wherein the first coordinate information comprises a first coordinate on a first axis and a second coordinate on a second axis, wherein the second coordinate information comprises a third coordinate on the first axis and a fourth coordinate on a third axis, wherein the third coordinate is related to the first coordinate, and wherein the memory stores instructions configured to cause, when executed by the processor, the electronic device to:

identify the three-dimensional coordinate information based on at least one of the first coordinate or the third coordinate, and based on the second coordinate and the fourth coordinate.

7. The electronic device of claim 1, wherein the first coordinate information comprises a first coordinate on a first axis, a second coordinate on a second axis, and a third coordinate on a third axis, wherein the second coordinate information comprises a fourth coordinate on the first axis, a fifth coordinate on the second axis, and a sixth coordinate on the third axis, and wherein the fourth coordinate is related to the first coordinate.

8. The electronic device of claim 1, further comprising at least one of a camera or a time-of-flight (ToF) sensor, wherein the memory stores instructions configured to cause, when executed by the processor, the electronic device to: obtain position information about the at least one object from the at least one of the camera or the ToF sensor; and modify at least one of the first coordinate information, the second coordinate information, or the three-dimensional coordinate information based on the position information.

9. The electronic device of claim 8, wherein the at least one of the camera or the ToF sensor is exposed to an outside through at least one of the first surface or the third surface or is provided under at least one of the first area or the second area.

10. The electronic device of claim 8, wherein the memory stores instructions configured to cause, when executed by the processor, the electronic device to:

identify, using the at least one of the camera or the ToF sensor, a position of the at least one object for an area related to the identified three-dimensional coordinate information.

11. The electronic device of claim 1, wherein the memory stores instructions configured to cause, when executed by the processor, the electronic device to:

based on an angle between the first surface and the third surface being greater than or equal to a predesignated angle, identify two-dimensional coordinate information of the at least one object on the first area or the second area based on the first coordinate information or the second coordinate information, and based on the angle between the first surface and the third surface being less than or equal to the predesignated angle, identify the three-dimensional coordinate information.

12. The electronic device of claim 1, further comprising at least one sensor, wherein the at least one sensor comprises at least one of an acceleration sensor, a gyro sensor, or a gravity sensor, and wherein the memory stores instructions configured to cause, when executed by the processor, the electronic device to:
- identify a posture of the electronic device using the at least one sensor; and
- determine the identified three-dimensional coordinate information based on the identified posture.

13. The electronic device of claim 1, wherein the memory stores instructions configured to cause, when executed by the processor, the electronic device to:
- display a position of the at least one object in at least one of the first area or the second area based on at least one of the first coordinate information, the second coordinate information, or the identified three-dimensional coordinate information.

14. The electronic device of claim 13, wherein the memory stores instructions configured to cause, when executed by the processor, the electronic device to:
- display a different position of the at least one object according to a distance from at least one of the first area or the second area to the at least one object.

15. The electronic device of claim 1, wherein the memory stores instructions configured to cause, when executed by the processor, the electronic device to:
- identify at least one of a position or a movement of the at least one object based on the identified three-dimensional coordinate information;
- identify a user gesture based on at least one of the identified at least one of the position or the movement of the at least one object; and
- control an external electronic device to perform a designated operation corresponding to the identified user gesture.

16. An operation method of an electronic device, the method comprising:
- identifying, using a touch sensor included in the electronic device, first coordinate information of at least one object on a first area of a flexible display included in the electronic device and second coordinate information of the at least one object on a second area of the flexible display included in the electronic device, wherein the first area exposed through at least a portion of a first surface of a first housing included in the electronic device and a second area exposed through at least a portion of a third surface of a second housing included in the electronic device, wherein in a folded state of the electronic device, the first surface faces the third surface and, in an unfolded state of the electronic device, the first surface and the third surface form a substantially coplanar plane; and
- identifying, based on the first coordinate information and the second coordinate information, three-dimensional coordinate information of the at least one object on a space formed by the first surface and the third surface.

17. The method of claim 16, further comprising:
- changing a coordinate value measured with respect to the first surface into a coordinate value on a predesignated coordinate system based on a predesignated angle; and
- identifying the three-dimensional coordinate information based on the changed coordinate value and the second coordinate information.

18. The method of claim 16, further comprising:
- identifying, using at least one angle sensor included in the electronic device, an angle between the first surface and the third surface;
- changing a coordinate value of the first coordinate information into a coordinate value on a predesignated coordinate system based on the identified angle; and
- identifying the three-dimensional coordinate information based on the changed coordinate value and the second coordinate information.

19. The method of claim 18, further comprising:
- identifying a difference between the angle between the first surface and the third surface and a predesignated angle; and
- changing the coordinate value of the first coordinate information into the coordinate value on a predesignated coordinate system based on the identified difference.

20. A non-transitory computer readable medium storing instructions, wherein the instructions, when executed by a processor of an electronic device, causes the electronic device to:
- identify, using a touch sensor included in the electronic device, first coordinate information of at least one object on a first area of a flexible display included in the electronic device and second coordinate information of the at least one object on a second area of the flexible display included in the electronic device, wherein the first area exposed through at least a portion of a first surface of a first housing included in the electronic device and a second area exposed through at least a portion of a third surface of a second housing included in the electronic device, wherein in a folded state of the electronic device, the first surface faces the third surface and, in an unfolded state of the electronic device, the first surface and the third surface form a substantially coplanar plane, and
- identify, based on the first coordinate information and the second coordinate information, three-dimensional coordinate information of the at least one object on a space formed by the first surface and the third surface.

* * * * *